United States Patent
Ueki

(10) Patent No.: US 6,711,103 B2
(45) Date of Patent: Mar. 23, 2004

(54) DISK TYPE DETERMINING APPARATUS, OPTICAL DISK REPRODUCING APPARATUS AND TRACKING ERROR SIGNAL GENERATING APPARATUS

(75) Inventor: Yasuhiro Ueki, Sagamihara (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 10/400,687

(22) Filed: Mar. 28, 2003

(65) Prior Publication Data

US 2003/0161231 A1 Aug. 28, 2003

Related U.S. Application Data

(62) Division of application No. 09/822,209, filed on Apr. 2, 2001, now Pat. No. 6,608,805, which is a division of application No. 09/514,180, filed on Feb. 28, 2000, now Pat. No. 6,249,494, which is a division of application No. 08/936,749, filed on Sep. 25, 1997, now Pat. No. 6,052,344.

(30) Foreign Application Priority Data

Sep. 25, 1996 (JP) .............................. 8-274236

(51) Int. Cl.$^7$ ................................ G11B 7/00
(52) U.S. Cl. .................. 369/44.27; 369/53.22
(58) Field of Search ................. 369/94, 44.27, 369/44.29, 53.2, 53.22, 53.23, 53.37, 112.02, 112.24, 44.25

(56) References Cited

U.S. PATENT DOCUMENTS 5,003,521 A  3/1991  Yoshida et al. .......... 369/44.25

(List continued on next page.)

FOREIGN PATENT DOCUMENTS

| EP | 0567318 | 10/1993 |
|---|---|---|
| EP | 0725395 A2 | 8/1996 |
| EP | 0727776 A1 | 8/1996 |
| EP | 0731457 | 9/1996 |
| EP | 0767456 A1 | 4/1997 |
| EP | 1126447 A2 | 8/2001 |
| WO | WO96/28816 | 9/1996 |
| WO | WO97/34296 | 9/1997 |

OTHER PUBLICATIONS

Patent Abstracts of Japan, vol. 17, No. 366, Jul. 9, 1993 and JP05054406A (Matsushita Electric Ind Co Ltd), Mar. 5, 1993.

(List continued on next page.)

*Primary Examiner*—Thang V. Tran
(74) *Attorney, Agent, or Firm*—Jacobson Holman PLLC

(57) ABSTRACT

The present invention measures first and second detection signals respectively obtained at two focuses during a focus search by means of an optical head 2. Then, a type of a disk-shaped optical record medium is determined by a microcomputer in a system controller 7, from a comparison between characteristics of the first and second measured detection signals. Moreover, the present invention can measure an amplitude and a frequency of the detection signal obtained at the focus during the focus search to thereby determine the type of the disk by using the measured result. After the parameters are set in accordance with the determined result, the focus servo control is turned on. The present invention comprises a selecting means for suitably switching and selecting between two types of tracking error signals, measures first and second detection signals respectively obtained at two focuses during a focus search, determine a type of a disk-shaped optical record medium by using the first and second measured detection signals and then controls the selecting means in accordance with the determined disk type. Moreover, the present invention measures an amplitude and a frequency of the detection signal obtained at one focus during the focus search, determines the disk type by using the measured result and then controls a timing at which a servo control is turned on in accordance with a conformity of a lens to the disk.

2 Claims, 30 Drawing Sheets

U.S. PATENT DOCUMENTS

| | | | |
|---|---|---|---|
| 5,665,957 A | 9/1997 | Lee et al. | 250/201.5 |
| 5,671,203 A | 9/1997 | Ra | 369/58 |
| 5,742,575 A | 4/1998 | Yamakawa et al. | 369/58 |
| 5,757,745 A | 5/1998 | Takeya | 369/44.27 |
| 5,790,493 A | 8/1998 | Takeya et al. | 369/58 |
| 5,802,029 A | 9/1998 | Zucker | 369/58 |
| 5,831,953 A | 11/1998 | Numata | 369/58 |
| 5,903,531 A | 5/1999 | Satoh et al. | 369/44.29 |
| 5,917,791 A * | 6/1999 | Tsuchiya et al. | 369/53.23 |
| 6,034,935 A * | 3/2000 | Kim et al. | 369/53.28 |
| 6,222,803 B1 * | 4/2001 | Uemura et al. | 369/44.37 |
| 6,321,028 B1 * | 11/2001 | Kajiyama et al. | 369/118 |

OTHER PUBLICATIONS

Patent Abstracts of Japan, vol. 11, No. 279, Sep. 10, 1987 & JP 62 076061 A (Toshiba Corp.).

"Compact Disk Reader", published by OHMO–sha, 1982, pp. 134–135 with English Translation.

* cited by examiner

DISK TYPE DETERMINING APPARATUS, OPTICAL DISK REPRODUCING APPARATUS AND TRACKING ERROR SIGNAL GENERATING APPARATUS

This is a Divisional of application Ser. No. 09/822,209 filed Apr. 2, 2001 U.S. Pat. No. 6,608,805 which is a Div of Ser. No. 09/514,180 filed Feb. 28, 2000 U.S. Pat. No. 6,249,494 which is a Div of Ser. No. 08/936,749 filed Sep. 25, 1997 U.S. Pat. No. 6,052,344.

BACKGROUND OF THE INVENTION

1. Field of the Invention

The present invention relates to an optical disk(disc) recording/reproducing apparatus for recording and reproducing a signal on and from a disk(disc)-shaped record medium or an optical disk reproducing apparatus, and more particular to a disk type determining apparatus used in such an apparatus, an optical disk reproducing apparatus which can change an operational condition in accordance with the determined disk type, and a tracking error signal generating apparatus used in such a disk reproducing apparatus.

2. Description of the Related Art

Generally, in this type of an information reproducing apparatus, a tracking control and a focus control for an optical head are performed so as to accurately write or read data when recording or reproducing. Such controls are performed by controlling the optical head by means of a so-called servo control circuit. Typically, a three-beam method and a phase difference method (a phase difference detecting method: a DPD (Differential Phase Detect) method) are actually used as a method of generating a tracking error signal used in the tracking control for the optical head. These methods are described in, for example, "Compact Disk Reader" edited by Ohm Company, page 134–138 (1982) and Japanese Patent Application Laid-open (KOKAI) No. 61-230637 Gazette. Various types are developed as a disk-shaped optical record medium. A plurality of types, such as a CD-ROM, a video CD, a DVD (Digital Versatile Disk) and the like, are actually used in addition to a so-called CD (Compact Disc), as a disk having a diameter of 12 cm. Although data formats, compression manners, data record densities for the recorded information are various in these disks, all of diameters are 12 cm. Moreover, data can be read out by the optical head (optical pickup). Thus, a reproducing apparatus which can be used in several types of disks is developed. A utilization of a two-focus type of an optical head is proposed in order to implement a plural use reproducing apparatus for a single-layer type, a two-layer type and a phase variation type for recording and reproducing, as CD having a thickness of 1.2 mm and DVD in which two layers (each has a thickness of 0.6 mm) are pasted together.

In a case of using such a two-focus type of an optical head, unless an appropriate focus position is found out by a so-called focus search and then a focus servo control is turned on, a disk type can not be determined. In the plural use reproducing apparatus, respective parameters and the like for a signal processing circuit are suitably selected and set in accordance with the disk type. Thus, if the determination of the disk type is not finished, reproduction of data on the disk can not be started. Hence, it takes a long time to start the reproduction.

On the other hand, when considering the dual use reproducing apparatus for CD having a thickness of 1.2 mm and DVD having a thickness of 0.6 mm, the three-beam method is optimal for the CD as a method of generating the tracking error signal. However, when applying this three-beam method to the DVD, a signal of a layer that is not targeted is leaked into especially in a case of the two-layer DVD, and then this results in a problem. Moreover, in the three-beam method, a cross talk from adjacent tracks results in a problem in a case of a land group record of recording on a phase variation medium at a high density. The phase difference method is suitable for the DVD. However, when a light spot is small at a time of applying to the CD, a wave of the tracking error signal does not become a sine wave. Thus, this may result in a problem at a time of a track cross. And, in the phase difference method (Differential Phase Detect method), a quality of the tracking error signal may be deteriorated by a depth of a bit. Furthermore, when using a two-lens type of an optical pickup, unless turning on the focus servo control and then reading out a signal from a disk, the disk type can not be determined. Hence, it takes a long time to start the reproduction.

SUMMARY OF THE INVENTION

It is therefore a first object of the present invention to provide a disk type determining apparatus which can determine a disk type in a short time so as to be suitable for a dual use reproducing apparatus for CD and DVD in which a two-focus type of an optical pickup is used.

Moreover, it is a second object to provide an optical disk reproducing apparatus, which uses the disk type determining apparatus that can determine the disk type in a short time to thereby set circuit parameters corresponding to the determined disk so that a time it takes to start the reproduction is short.

It is therefore a third object of the present invention to provide a tracking error signal generating apparatus which can suitably switch and select between a tracking error signal generated by the three-beam method and a tracking error signal generated by the phase difference method so as to be suitable for the dual use reproducing apparatus for CD and DVD. Moreover, if the disk type can be automatically determined in order to switch between these tracking error signals, this switching operation can be automated.

It is therefore a fourth object of the present invention to provide a disk type determining apparatus which can automatically determine the disk type and a tracking error signal generating apparatus which can select between these tracking error signals in accordance with such a determined result.

Further, it is a fifth object to provide a disk type determining apparatus which can quickly determine the disk type when a two-lens type and optical pickup is used, and an optical disk reproducing apparatus in which a time it takes to start the reproduction is short.

Objects and advantages of the present invention will be apparent from the following descriptions of the embodiments of the invention as illustrated in the accompanying drawings.

DETAILED DESCRIPTION OF THE PREFERRED EMBODIMENTS

Figure 1:
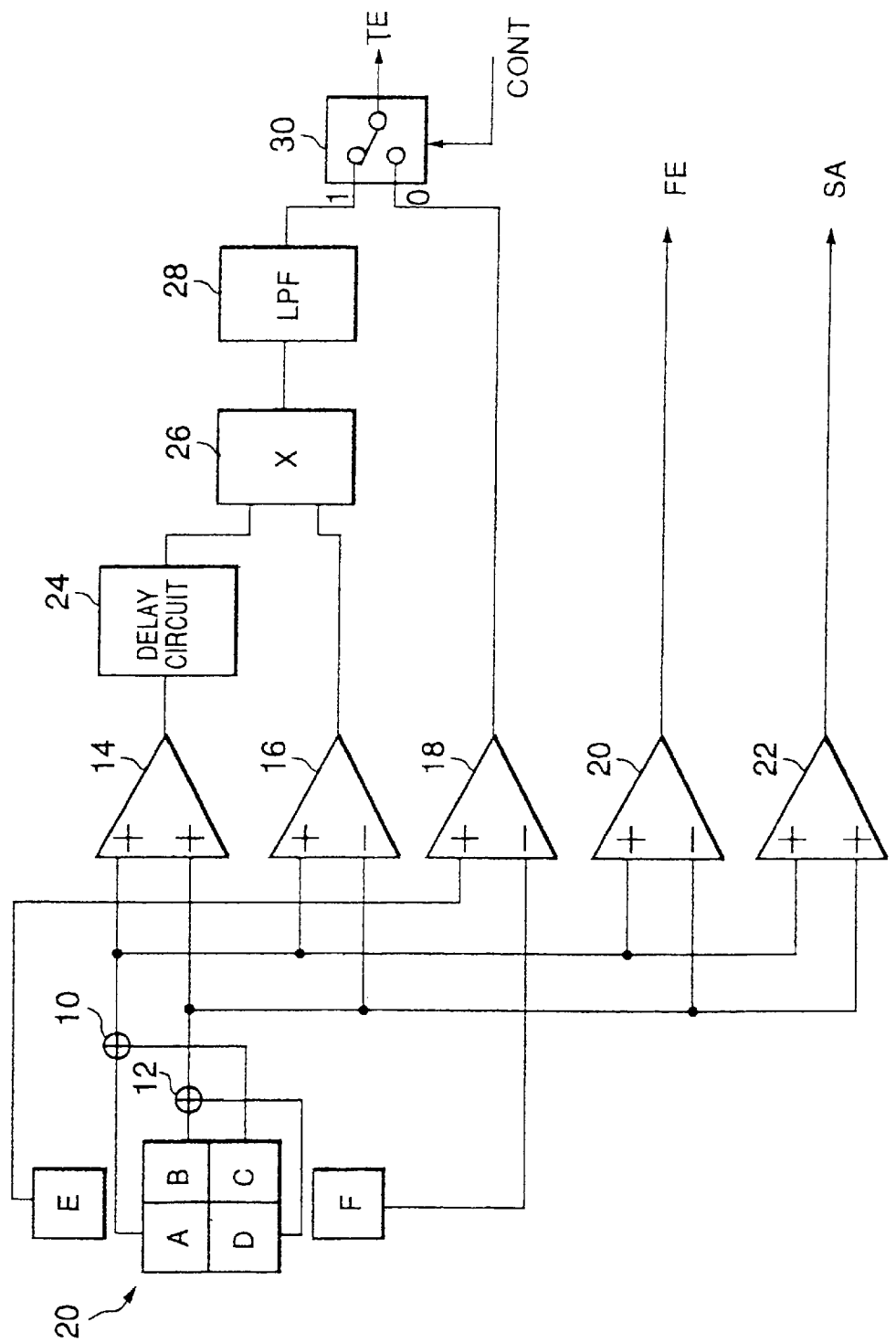
FIG. 1 is a circuit diagram showing an optical pickup and a calculating device (one portion of a preamplifier in FIG. 2) responding to an output signal from the optical pickup in an embodiment of an optical disk reproducing apparatus (including a disk type determining apparatus) of the present invention.
Figure 2:
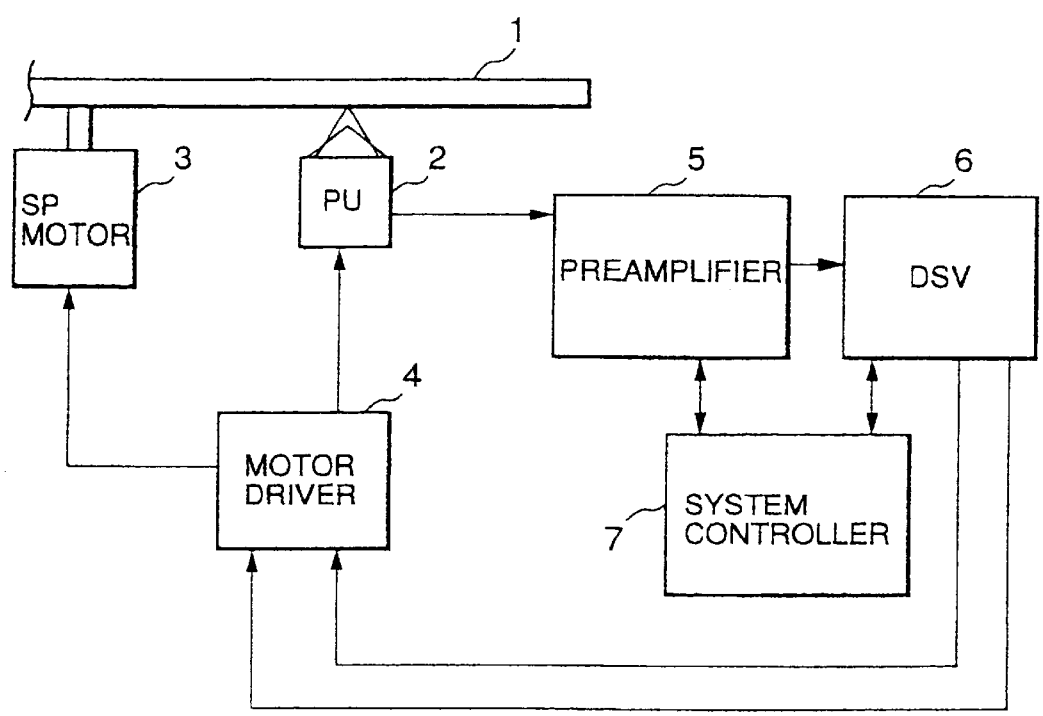
FIG. 2 is a block diagram showing one embodiment of the optical disk reproducing apparatus (including the disk type determining apparatus) of the present invention.

Embodiments of the present invention are explained with reference to the drawings. FIG. 2 is a block diagram showing one example of an optical disk reproducing apparatus according to the present invention. This optical disk reproducing apparatus reproduces information from a dedicated reproduction type of CD and DVD. The DVD includes a two-layer type dedicated to a reproduction, a write-once type and a recording and reproducing type. FIG. 1 is a circuit diagram showing an optical pickup (PU) in FIG. 2 and a calculating device (one portion of a preamplifier in FIG. 2) responding to an output signal from the optical pickup, and shows a circuit example of selecting one of two types of tracking error signals based on a determined result of a disk type.

In FIG. 2, a control is performed by a motor driver/ tracking focus control circuit 4 so that a disk 1 is rotated at CLV (constant line velocity) by a spindle (SP) motor 3. A signal, which is read out from the disk 1 by an optical pickup (optical head) 2, is sent to a preamplifier 5 whose output signal is sent to a digital servo control circuit 6. A system controller 7 sends and receives signals to and from the preamplifier 5 and the digital servo control circuit 6 to thereby control the optical disk reproducing apparatus as a whole. An output signal from the digital servo control circuit (DSV) 6 is sent to the motor driver/tracking focus control circuit 4, which performs a rotational control for the spindle motor 3 and a tracking servo control and a focus servo control for the optical pickup. In addition the servo control circuit, the DSV 6 comprises a variable speed controller, a memory controller, an EFM demodulation circuit, an error correction circuit and the like, and also has a function of sending a reproduction signal by using a memory (not shown). The optical pickup 2 can be moved in a radius direction of the disk 1 by a traverse motor (not shown). Also, an objective lens can be moved in a focus direction, that is, in a direction along an optical path, by a focus servo control mechanism (not shown).

The optical pickup 2 also has a laser diode for emitting a laser beam to the disk 1, and then outputs a signal in which optical information recorded on the disk 1 is reproduced in accordance with a reflection light of the laser beam, and outputs signals A to D, as shown in FIG. 1, for detecting a focus error signal FE by means of an astigmatism method and also for detecting a tracking error signal by means of a phase difference method, and signals E, F for detecting two types of tracking error signals by means of a three-beam method. These signals are sent to the preamplifier 5, and then a necessary calculation is performed.

FIG. 1 diagrammatically shows the optical pickup 2 having four divided optical sensor portions A, B, C and D and optical sensor portions E, F used in the three-beam method, and also shows the calculating device responding to the output signals from these optical sensor portions. The symbols A to F show both these optical sensor portions and the output signals thereof. An adder 10 adds and outputs the output signals of the optical sensor portions A, C located on a diagonal line, and an adder 12 adds and outputs the output signals of the optical sensor portions B, D located on the other diagonal line. Adders 14, 22 both add output signals of the adders 10, 12. Subtracters 16, 20 both subtract the output signal of the adder 12 from the output signal of the adder 10. A subtracter 18 subtracts the output signal of the optical sensor portion F from the output signal of the optical sensor portion E. An output signal of the adder 14 is given to one input terminal of a multiplier (×) 26 through a delay circuit 24. An output signal of the subtracter 16 is given to the other input terminal of the multiplier 26 while maintaining its original state. An output signal of the multiplier 26 is given to one input terminal (a side 1) of a switch 30 through an LPF 28. An output signal of the subtracter 18 is given to the other input terminal (a side 0) of the switch 30. A selected tracking error signal TE is outputted from an output terminal of the switch 30.

A control signal CONT given to the switch 30 controls the switch 30 to thereby select one of the two input signals, and it is generated by the microcomputer in the system controller 7 as described hereinbelow. An output signal of the subtracter 20 is given to the well known focus servo control system so as to be used as the focus error signal FE. An output signal of the adder 22 is outputted as a sum all signal (SA) of the four divided optical sensor portions. The sum all signal SA is a main signal to read out the record information on the disk, and also a measured target signal for the disk type determination as described later. Incidentally, the sum all signal SA can be also outputted through an LPF (not shown) in order to remove a high frequency element which may be contained in the sum all signal SA. Moreover, the focus error signal FE is used in the well known focus servo control. A delay time of the delay circuit 24 is set to a time corresponding to a quarter of a period in a reproduction frequency of the DVD.

The system controller 7 determines a disk type by using an operation of a microcomputer (not shown) described hereinbelow. It is possible to switch over between the two types of the tracking error signals in accordance with the determined result of the disk type according to the present invention to thereby use the three-beam method and the phase difference method properly in a CD with a low record density and a disk with a high record density. However, the microcomputer in the system controller 7 generates the control signal CONT based on the type of the disk 1. Namely, if determined as the CD with the low record density, the switch 30 in FIG. 1 is connected to the side 0 so as to select the tracking error signal of the three-beam method and then the output signal of the subtracter 18 is outputted. On the other hand, if determined as the disk with the high record density, the switch 30 is connected to the side 1 so as to select the tracking error signal of the phase difference method and then the output signal of the LPF 28 is outputted.

Next, a method is explained for determining the disk type by using as the optical pickup 2 of a two-focus type, that is, a type of responding to disks which are different in thickness from each other by disposing two convergent points on an objective lens, such as disclosed in Japanese Patent Application Laid-open No. 7-65407 Gazette or Japanese Patent Application Laid-open No. 7-98431 Gazette. Then, it is assumed that the optical pickup 2 reads out information from two types of disks, that is, a CD having a plate thickness t1 of 1.2 mm and a DVD having a plate thickness t2 of 0–6 mm, at spots of NA=0.38 mm and NA=0.6 mm. A distance between the two focuses is assumed to be 0.3 mm. If images are simultaneously formed on a disk surface and a signal surface, they are affected by a modulation at a low frequency and an offset as the influence of the disk surface. Thus, an interval between the two focuses can not be set similarly to the case of the thickness of the disk.

Figure 3:
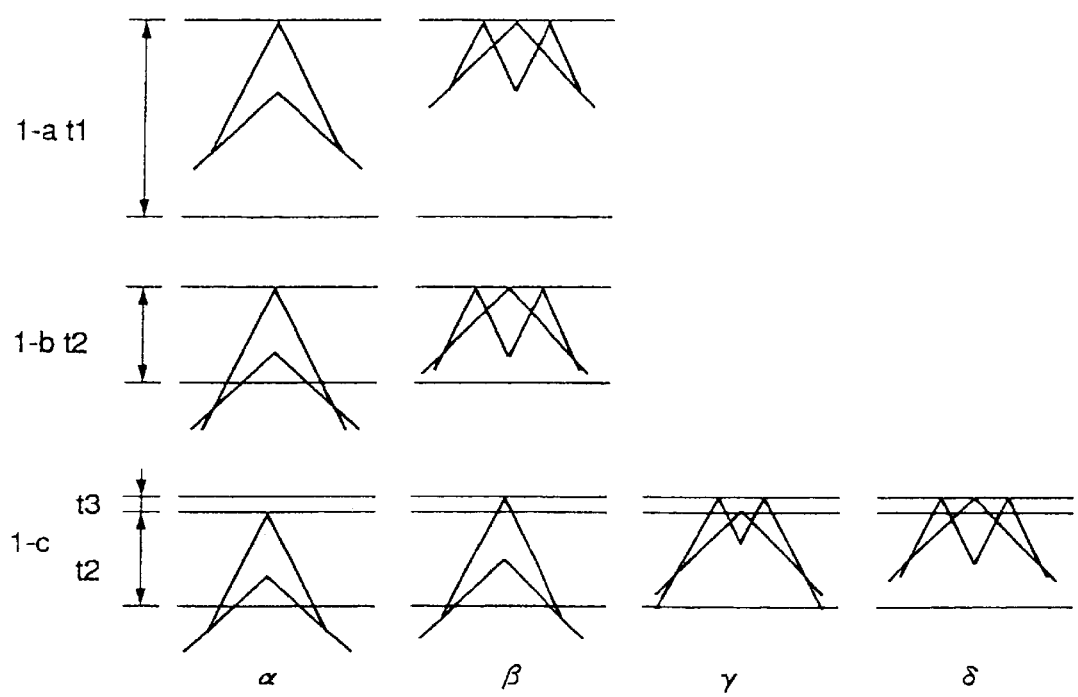
FIG. 3 is a view showing beam-collecting states of laser beams to a disk in a two-focus type of an optical pickup.
Figure 4:
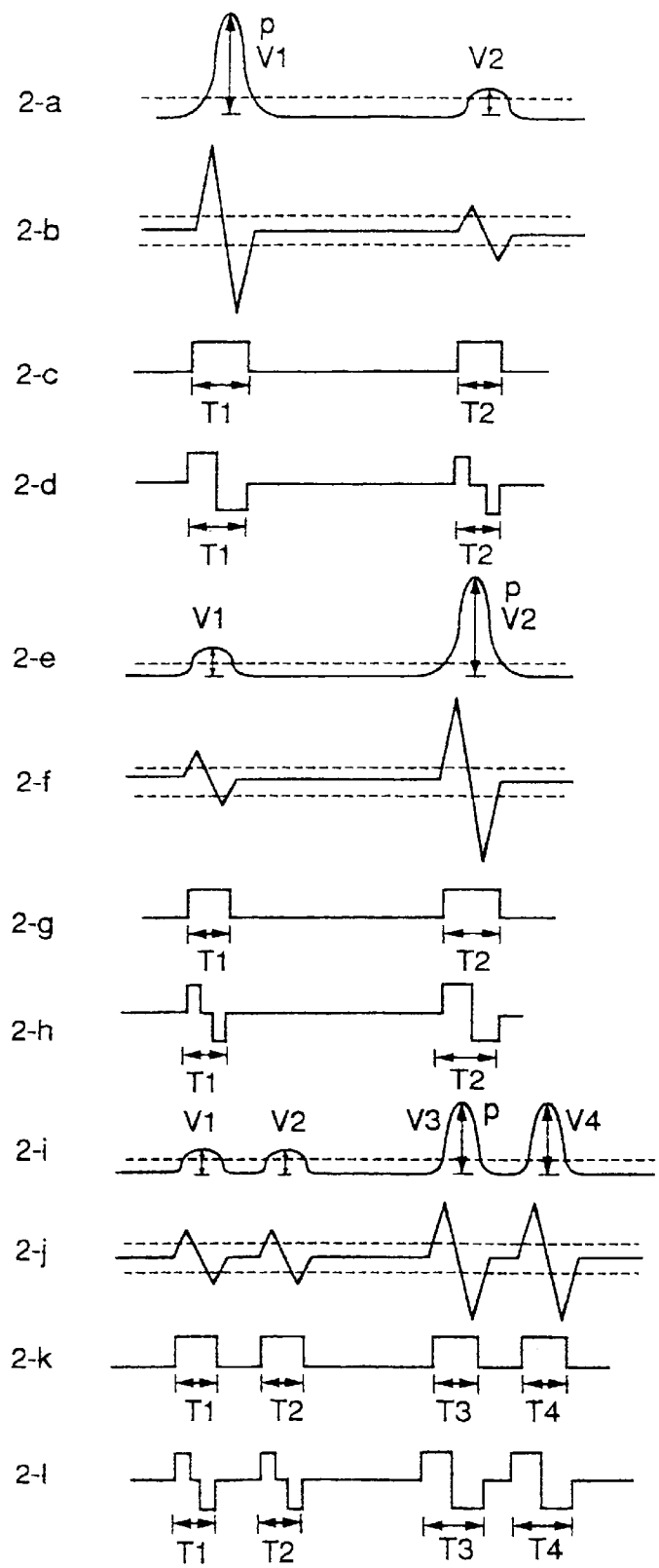
FIG. 4 is a wave form diagram showing various signal waves obtained from output signals when a focus search is performed by the optical pickup in accordance with FIG. 3.

FIG. 3 shows beam-collecting states of a laser beam to the disk 1 in the two-focus type of the optical pickup. References (1-*a*), (1-*b*) and (1-*c*) of FIG. 3 show the beam-collecting states to the disk having the thickness t1 of 1.2 mm, the disk having the thickness t2 of 0.6 mm and a two-layer type disk in which one layer has a thickness of 0.6 mm (a distance between the layers t3=40 $\mu$m), respectively. Then, a beam on an upper side at an early line is used for 1.2 mm, and a beam on a low side at a later line is used for 0.6 mm. In FIG. 3, $\alpha$, $\beta$, $\gamma$ and $\delta$ show respective states when the objective lens of the optical pickup 2 is moved in the focus direction. FIG. 4 shows various signal wave forms obtained from output signals when the focusing search is performed by the optical pickup 2 in accordance with FIG. 3. Namely, in FIG. 4, a vertical axis shows a voltage, a horizontal axis shows a time and then p shows a peak. Since the two-focus type of the optical pickup is constituted by a hologram lens, a signal is detected at a position other than the two spots of the two focuses, as described in Japanese Patent Application Laid-open No. 7-98431 Gazette. However, a signal other than the two-focus detecting signal is omitted here.

References (2-*a*) to (2-*d*) of FIG. 4 correspond to the disk at (1-*a*) of FIG. 3, references (2-*e*) to (2-*h*) correspond to the disk at (1-*b*) of FIG. 3 and references (2-*i*) to (2-*l*) correspond to the disk at (1-*c*) of FIG. 3, respectively. Moreover, the sum all signals SA of FIG. 1 are (2-*a*), (2-*e*) and (2-*i*) of FIG. 4. The focus error signals FE are (2-*b*), (2-*f*) and (2-*j*) of FIG. 4. Further, signals obtained as the results when comparing the sum all signals SA with thresholds indicated by dashed lines are (2-*c*), (2-*g*) and (2-*k*) of FIG. 4. Furthermore, signals obtained as the results when comparing the focus error signals FE with thresholds represented by dashed lines are (2-*d*), (2-*h*) and (2-*l*) of FIG. 4.

Figure 5:
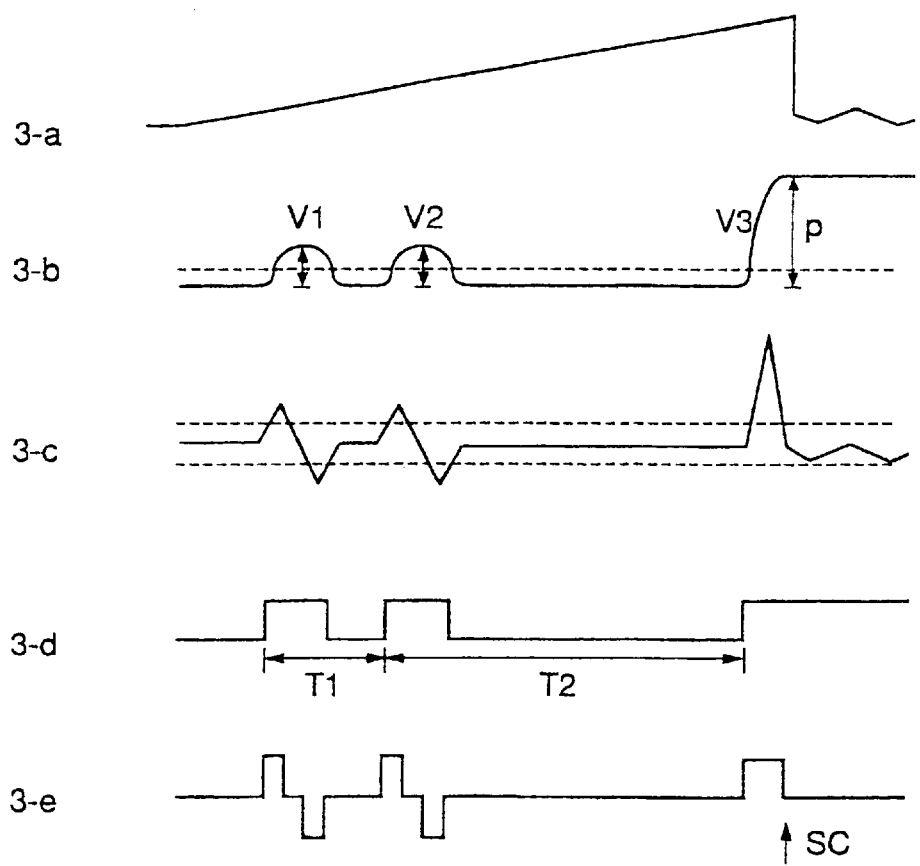
FIG. 5 is a wave form diagram showing a focus search in a two-layer disk.

The focus search is performed by increasing or decreasing a voltage applied to a focus coil of the optical pickup 2 and then moving the objective lens, which is one portion of the optical system in the optical pickup 2, along the optical path. In the wave form (2-*a*) of FIG. 4, a peak on a left side is obtained at a state a of the disk at (1-*a*) of FIG. 3, and a peak on a right side is similarly obtained at a state 8. In this way, the peaks in FIG. 4 correspond to the a and the (in FIG. 3. And, four peaks at the wave forms (2-*i*) to (2-*l*) correspond to α, β, γ and δ of the disk at (1-*c*) of FIG. 3. FIG. 5 is a wave form diagram showing the focus search in the two-layer disk, and shows a case in which the servo control is turned on at a second layer of the disk having the thickness of 0.6 mm. (3-*a*) shows the voltage applied to the focus coil, and (3-*b*) to (3-*e*) show wave forms corresponding to, for example, (2-*i*) to (2-*l*) of FIG. 4, respectively.

Figure 6:
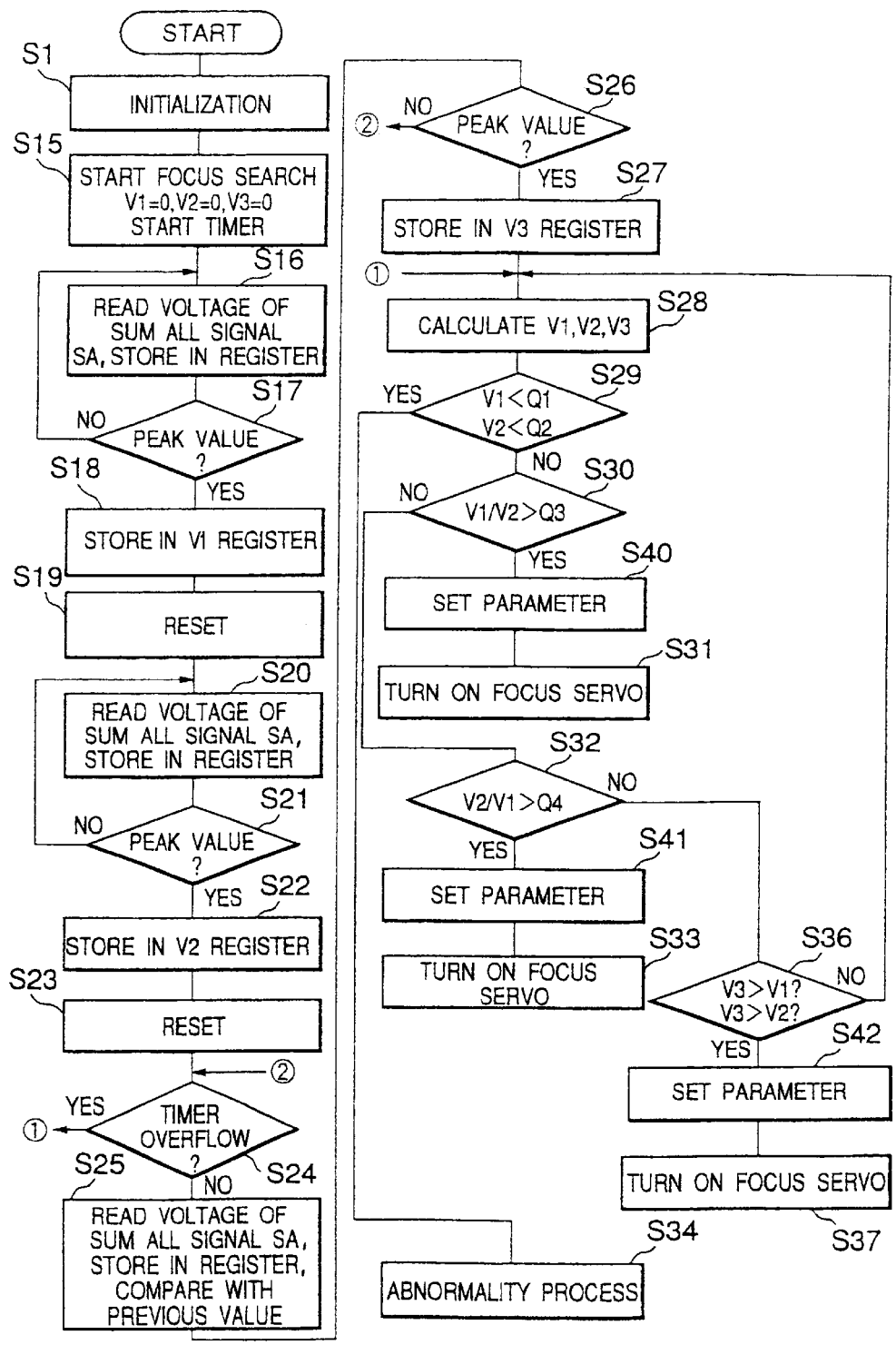
FIG. 6 is a flowchart showing a procedure (a first embodiment) to perform a determination of a disk type among operations in a microcomputer used in a system controller in FIG. 2.

FIG. 6 is a flowchart showing an operational procedure of the microcomputer to determine the disk type by means of the focus searches shown in FIG. 3 and FIG. 4 as the first embodiment of the present invention. An operational procedure of the microcomputer to use the determined result of the disk type and then control the switch 30 in FIG. 1 to thereby select one of the tracking error signals in the three-beam method and the phase difference method is described hereinbelow along a flowchart shown in FIG. 8. In FIG. 6, this flow is assumed to be started when a power supply of the reproducing apparatus is turned on or when the disk is exchanged or when data reproduction of another layer is required in a plural-layer type of a disk. At first, an initialization of clearing predefined contents of a memory and a buffer, which are not shown, connected to the microcomputer is performed at a step S1. Next, the focus search is started at a step S15. Contents of registers in which peak voltages V1, V2 and V3 are respectively stored are set to 0, and then a timer is started. Next, digital values obtained by A/D converting the voltages of the sum all signals SA are sequentially read in at a step S16, and are sequentially stored in predefined A/D conversion registers, and then are sequentially compared with a previous value. At a step S17, it is judged whether or not a peak value is detected as the sequential comparison results at the step S16. If YES, the peak value is stored in a V1 register at a step S18. If NO, the operational flow returns to the step S16.

After the operation at the step S17 is finished, the A/D conversion registers are reset at a step S19. Then, operations at steps S20, S21 similar to those at the steps S16, S17 are performed. A next peak value is stored in the V2 register at a step S22, and the A/D conversion registers are reset at a step S23. At a next step S24, it is judged whether or not a time measured by the timer exceeds a predefined time (overflow). If exceeded, the operational flow proceeds to a step S28. If not exceeding, the operational flow proceeds to a step S25. Operations at steps S25, S26 are respectively similar to those at the steps S16, S17. Then, the peak value is stored in the V3 register at a step S27. At the step S28, comparison calculations are performed by using the respective peak values V1, V2 and V3 obtained until that time.

At a next step S29, it is judged whether or not the V1 is smaller than a predefined value Q1 or the V2 is smaller than a predefined value Q2. If YES, the operational flow proceeds to an abnormality processing routine at a step S34. These predefined values Q1, Q2 are sufficiently smaller than the peak value obtained by the focus search in the normal disk. If NO at the step S29, it is judged at a step S30 whether or not V1/V2>Q3 (the Q3 is a ratio of V1 to V2 that is normally obtained in the disk having the thickness of 1.2 mm, for example, a predefined value of approximately 70% this value is varied by a design of the reproducing apparatus. Then, the ratio of V1 to V2 may be reversed because of a relation of a difference between the light quantities. This is said in the other similar comparison step). If YES at the step S30, a present disk is determined as a disk having a thickness of 1.2 mm. Then, predefined parameters are set at a step S40. Next, a focus servo control is turned on at a step S31. On the other hand, if NO at the step S30, it is judged at a step S32 whether or not V2/V1>Q4 (the Q4 is a ratio of V2 to V1 that is normally obtained in the disk having the thickness of 0.6 mm, for example, a predefined value of approximately 70%).

If YES at the step S32, a present disk is determined as a disk having a thickness of 0.6 mm. Then, predefined parameters are set at a step S41. Next, a predefined focus servo control is turned on at a step S33. On the other hand, if NO at the step S32, it is judged at a step S36 whether or not V3>V1 (when the V3 is measured) and also V3>V2. If YES at the step S36, predefined parameters are set at a step S42, and then at a step S37, the focus servo control is turned on at a time point SC (refer to the wave form (3-*e*)) when the signal shown at (3-*c*) of FIG. 5 has a center value. Although not shown, even operations of turning on the focus servo controls at the steps S31, S33 can detect the disk type during one focus search. Thus, the focus servo control can be turned on during the focus search, for example, immediately after detecting the peak voltage V2 at the wave form (2-*e*), and further the focus servo control can be turned on even in the focus search in a reverse direction.

The peak value V4 is not used in the flowchart in FIG. 6. The reason is described below. Namely, if the disk is determined as the two-layer disk by the detection of the V3 and by the comparison between the detected V3 and the V1 and the V2, a search time can be made short by turning on the servo control at a time point of the V3 before the V4 is detected. The settings of the predefined parameters at the steps S40, S41 and S42, in accordance with the determined disk type, set parameters, such as a laser power of the optical head, a gain, an offset, a balance and the like in the circuit of generating the focus error signal and the tracking error signal in the preamplifier 5, and necessary parameters among items, such as switching between characteristics of an equalizer described hereinbelow in the preamplifier 5 or the DSV 6, a delay amount of a unit delay device of a transversal filter in the same preamplifier 5 or the DSV 6, a tap gain and the like. Here, the equalizer and the transversal filter are assumed to be contained in one block of the preamplifier 5 or the DSV 6. Although the amplitudes of the sum all signals SA are measured in this case, a timing of a zero-cross of the focus error signal FE may be used when measuring the peak value, or voltage values (symmetric voltage values on one side or both sides) of S curves of the signals (2-*b*), (2-*f*) and (2-*j*) that are the focus error signals FE may be similarly measured.

Figure 7:
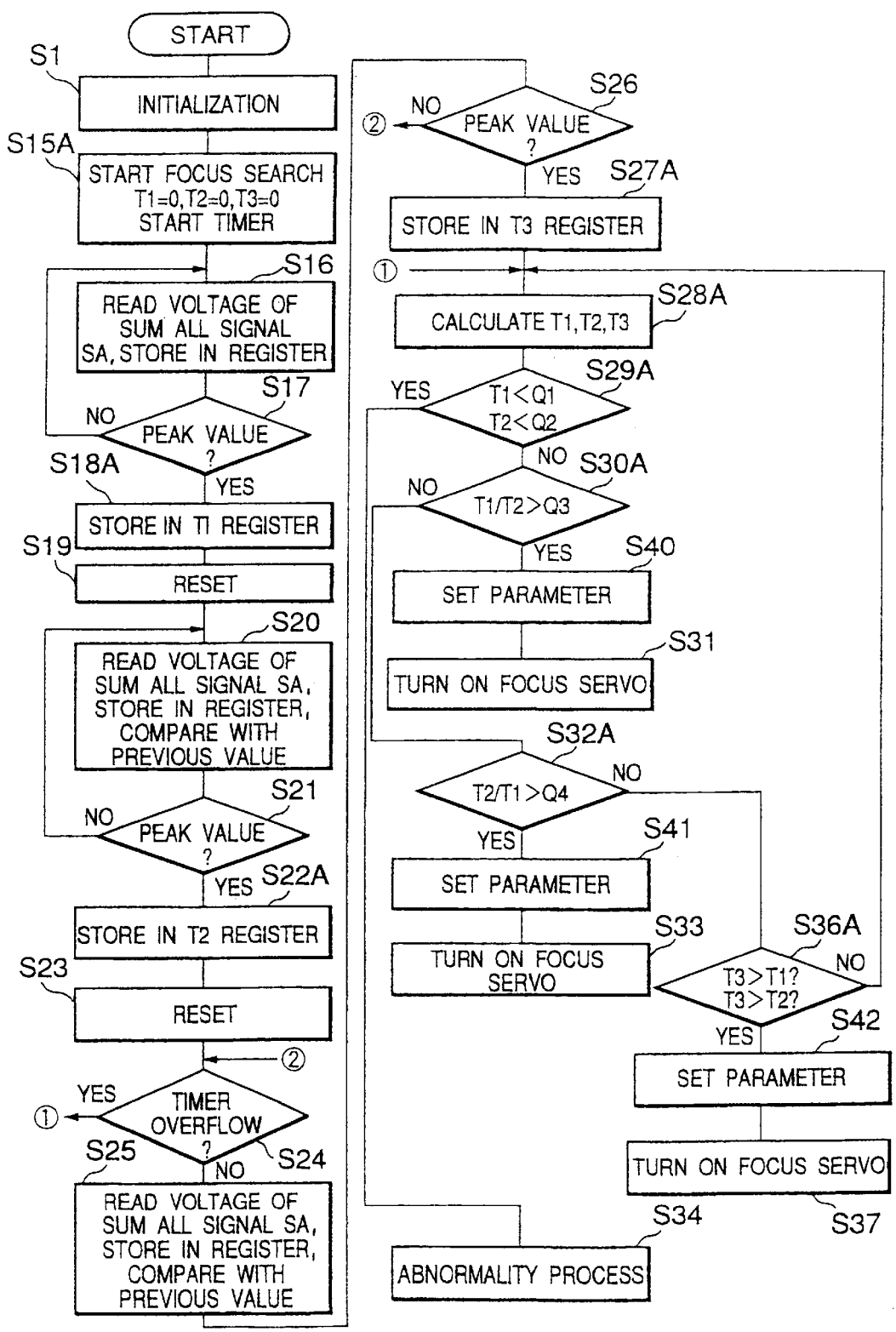
FIG. 7 is a flowchart showing a procedure (a second embodiment) to perform the determination of the disk type among the operations in the microcomputer used in the system controller in FIG. 2.

FIG. 7 is a flowchart showing an operational procedure of the microcomputer for the disk determination similar to that of FIG. 6, when using another method (a second embodiment) which is different from the example of FIG. 6 in the determination of the disk type by means of the focus search. In the example of FIG. 7, time widths of a predefined threshold at portions corresponding to the peaks are measured instead of the peak voltages V1, V2 and V3 in FIG. 6, and then the disk type is determined by the comparison between the time widths. Operations until a step S1 are similar to those of FIG. 6. The focus search is started at a step S15A. Contents of registers in which respective peak time widths T1, T2 and T3 are respectively stored are set to 0. Then, a timer is started. Next, digital values obtained by A/D converting the voltages of the sum all signals SA are sequentially read in at a step S16, and are sequentially stored in predefined A/D conversion registers, and then are sequentially compared with a previous value. At a step S17, it is judged whether or not a peak value is detected as the sequential comparison results at the step S16. If YES, the time width is stored in a T1 register at a step S18A. If NO, the operational flow returns to the step S16.

After the operation at the step S17 is finished, the A/D conversion registers are reset at a step S19. Then, operations at steps S20, S21 similar to those at the steps S16, S17 are performed. A next time width is stored in a T2 register at a step S22A, and the A/D conversion registers are reset at a step S23. At a next step S24, it is judged whether or not a time measured by the timer exceeds a predefined time (overflow). If exceeded, the operational flow proceeds to a step S28A. If not exceeded, the operational flow proceeds to a step S25. Operations at steps S25, S26 are respectively similar to those at the steps S16, S17. Then, the time width is stored in a T3 register at a step S27A. At the step S28A, comparison calculations are performed by using the respective time widths T1, T2 and T3 obtained until that time.

At a next step S29A, it is judged whether or not the T1 is smaller than a predefined value Q1 or the T2 is smaller than a predefined value Q2. If YES, the operational flow proceeds to an abnormality processing routine at a step S34. These predefined values Q1, Q2 are sufficiently smaller than the time width obtained by the focus search in the normal disk. If NO at the step S29A, it is judged at a step S30A whether or not T1/T2>Q3 (the Q3 is a ratio of T1 to T2 that is normally obtained in the disk having the thickness of 1.2 mm, for example, a predefined value of approximately 70%). If YES at the step S30A, a present disk is determined as a disk having a thickness of 1.2 mm. Then, predefined parameters are set at a step S40. Next, a predefined focus servo control is turned on at a step S31. On the other hand, if NO at the step S30A, it is judged at a step S32A whether or not T2/T1>Q4 (the Q4 is a ratio of T2 to T1 that is normally obtained in the disk having the thickness of 0.6 mm, for example, a predefined value of approximately 70%).

If YES at the step S32A, a present disk is determined as a disk having a thickness of 0.6 mm. Then, predefined parameters are set at a step S41. Next, a predefined focus servo control is turned on at a step S33. On the other hand, if NO at the step S32, it is judged at a step S36A whether or not T3>T1 (when the T3 is measured) and also T3>T2. If YES at the step S36A, predefined parameters are set at a step S42, and then at a step S37, the focus servo control is turned on at a peak center point of the wave form (the time point SC at the wave form (3-e)) shown at (3-c) of FIG. 5.

The time width T4 is not used in the flowchart in FIG. 7. The reason is described below. Namely, if determined as the two-layer disk by the detection of the T3 and by the comparison between the detected T3 and the T1 and the T2, a search time can be made short by turning on the servo control at a time point of the T3 before the T4 is detected. At the steps S40, S41 and S42, parameters are set in accordance with the determined disk, similarly to those of FIG. 6. Incidentally, the time widths of the signals (2-c), (2-g) and (2-k) in which the sum all signals SA are re-shaped are measured in this case. However, it is similarly allowable to measure all of the time widths T1, T2 and T3 of the signals (2-d), (2-h) and (2-l) in which the signals (2-b), (2-f)-and (2-j) servicing as the focus error signal FE are re-shaped, or a total of times of a section of the least value, a section of the intermediate value and a section of the maximum value in a three-value signal.

Figure 8:
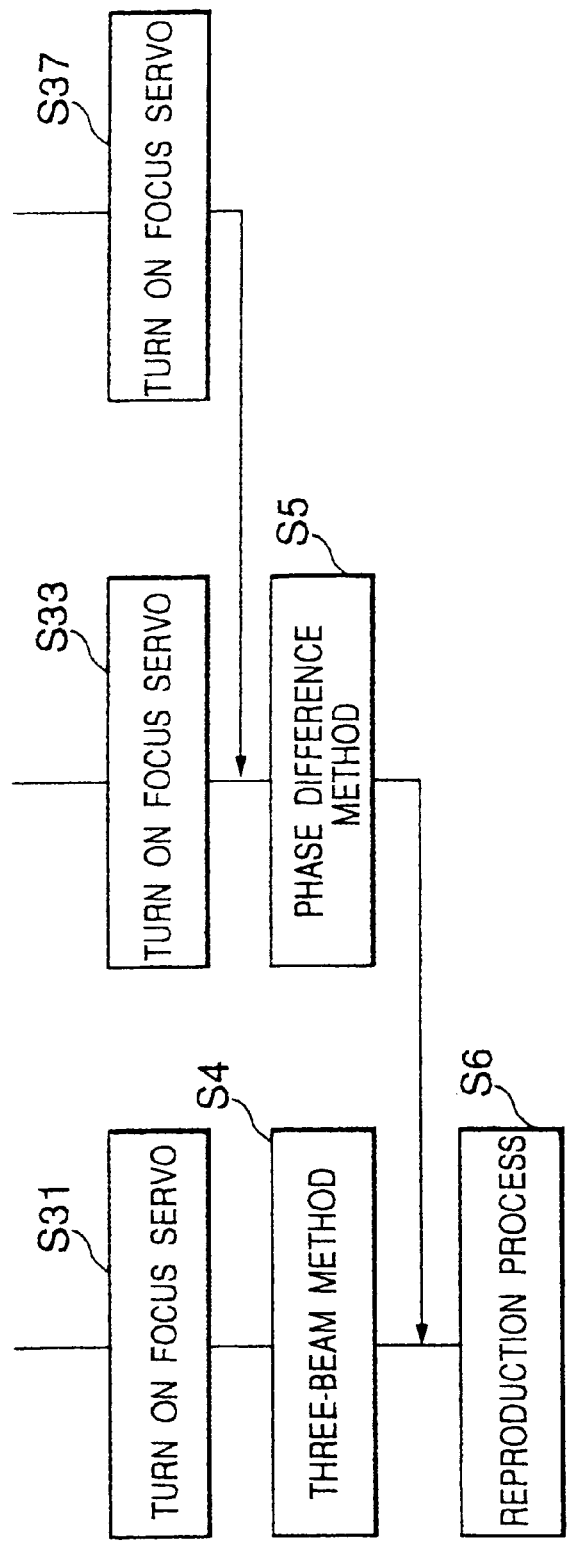
FIG. 8 is a flowchart showing another example of an operational procedure of the microcomputer to determine the disk type by means of the focus search and then control a switch 30 in FIG. 1 by using the determined result to thereby select one of tracking error signals in a three-beam method and a phase difference method.

FIG. 8 is a flowchart showing a procedure of controlling the switch 30 in FIG. 1 so as to select the tracking error signal based on the determined result of the disk type in FIG. 6 or FIG. 7. When the focus servo control is turned on at a step S31, the tracking error signal by means of the three-beam method is selected at a next step S4. On the other hand, when the focus servo control is turned on at a step S33 or at S37, the operational flow proceeds to a next step S5, and then the phase difference method is selected. After the steps S4, S5, the reproduction process is performed at a step S6. When selecting the tracking error signal by means of the three-beam method, the switch 30 in FIG. 1 is connected to the side 0, and then the output signal of the subtracter 18 is outputted. On the other hand, when the tracking error signal by means of the phase difference method is selected, the switch 30 is connected to the side 1, and then the output signal of the LPF 28 is outputted.

Figure 9:
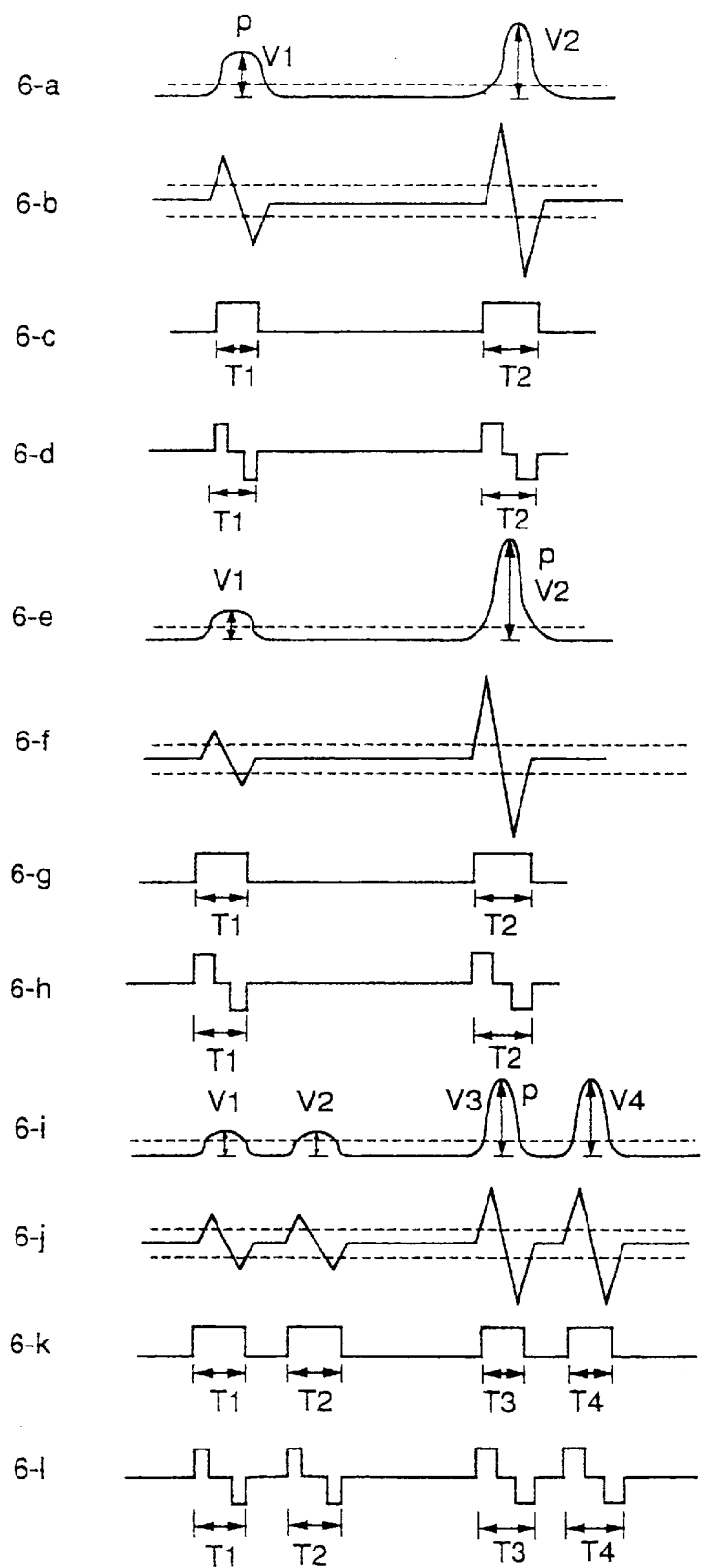
FIG. 9 is a wave form diagram showing a case in which light quantities at light spots in two focuses are different from each other.

In the first and second embodiments, when comparing the voltage values indicating two peaks or the durations of the two peaks, the difference between the values is not used, and then the ratio is used. Thus, they are suitable for not only the case in which the light quantities of the two focuses are in the ratio 1:1 but also the case in which the light quantities at the light spots of the two focuses are different from each other. Next, a third embodiment and a fourth embodiment are explained which are especially suitable for the case in which the light quantities at the light spots of the two focuses are different from each other. FIG. 9 is a wave form diagram showing a case in which the light quantities at the light spots of the two focuses are different from each other. Respective wave forms (6-a) to (6-l) correspond to the wave forms (2-a) to (2-l) in FIG. 4, respectively. The third embodiment is a variation example of the first embodiment shown in FIG. 1, and the fourth embodiment is a variation example of the second embodiment shown in FIG. 7.

Figure 10:
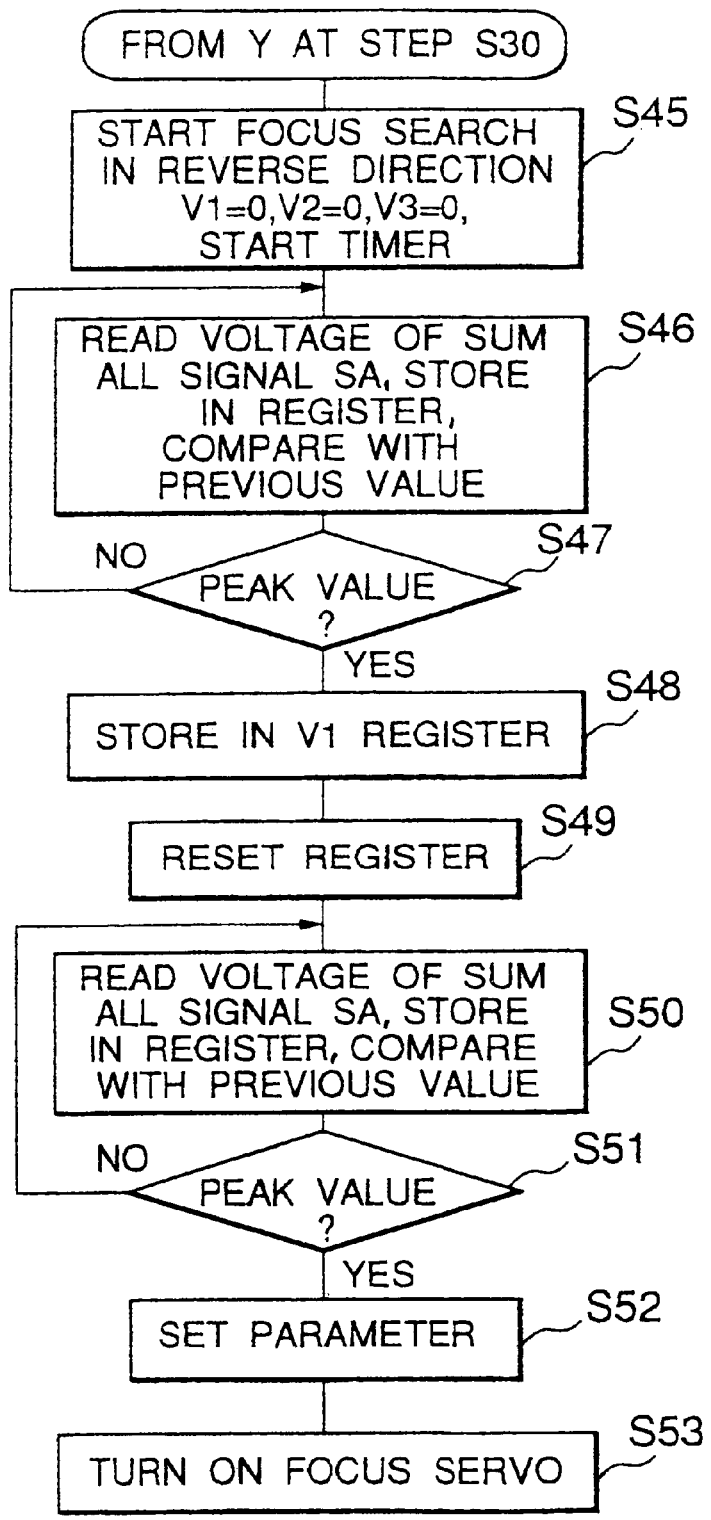
FIG. 10 is a flowchart showing one portion of a procedure (a third embodiment) to perform the determination of the disk type among the operations in the microcomputer used in the system controller in FIG. 2.

In the third embodiment, the operations on and after the step S30 in the flowchart in FIG. 6 are changed into those in a flowchart shown in FIG. 10. Similarly, in the fourth embodiment, the operations on and after the step S30A in the flowchart in FIG. 7 are changed into those in a flowchart shown in FIG. 11. In FIG. 10, if YES at the step 30, the focus search is started in a direction opposite to the focus search direction at the previous step S15. Contents of registers in which peak values V1, V2 and V3 are respectively stored are set to 0, and then the timer is started. Next, digital values obtained, by A/D converting the voltages of the sum all signals SA are sequentially read in at a step S46, and are sequentially stored in predefined A/D conversion registers, and then are sequentially compared with a previous value. At a step S47, it is judged whether or not a peak value is detected as the sequential comparison results at the step S46. If YES, the peak value is stored in a V1 register at a step S48. If NO, the operational flow returns to the step S46. After the operation at the step S47 is finished, the A/D conversion registers are reset at a step S49. Then, operations at steps S50, S51 similar to those at the steps S46, S47 are performed. If the peak value at a step S51, parameters are set at a step S52. Next, the focus servo control is turned on at a step S53.

Figure 11:
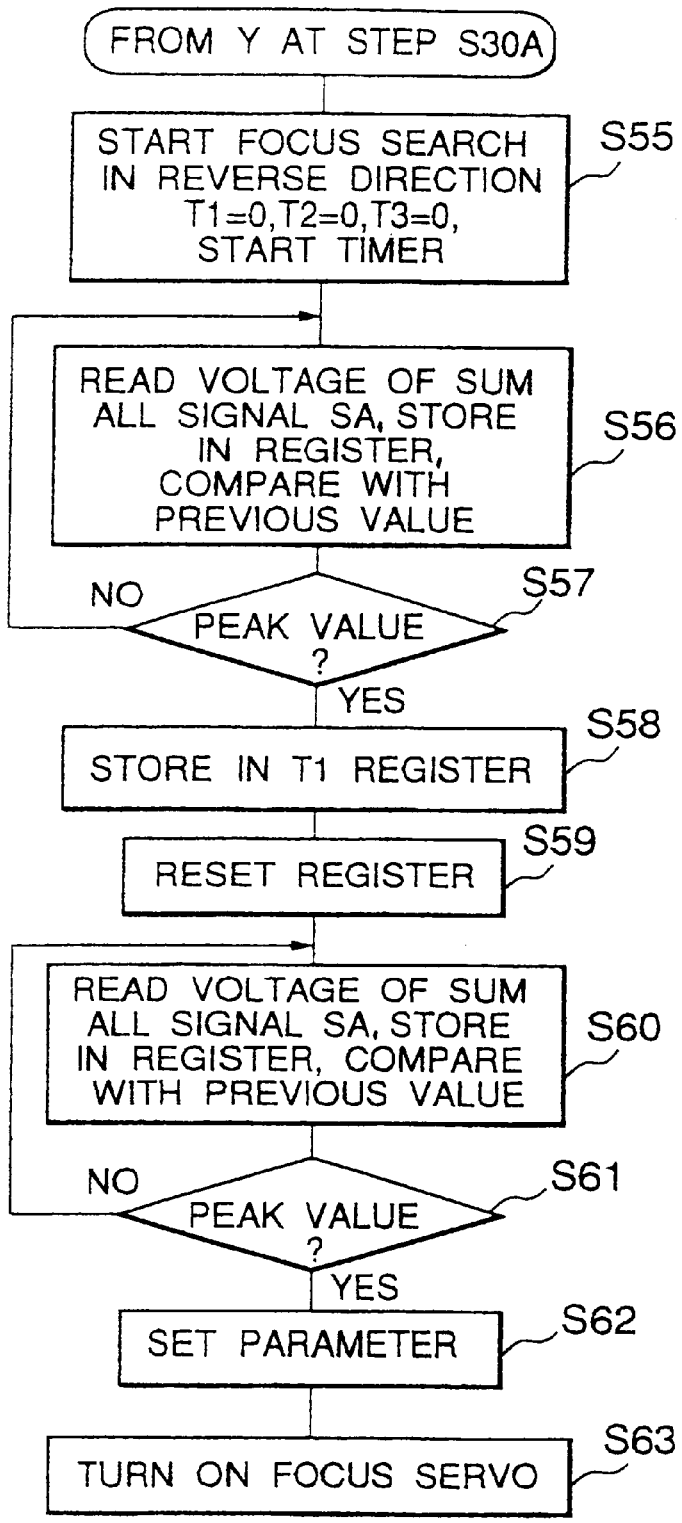
FIG. 11 is a flowchart showing one portion of a procedure (a fourth embodiment) to perform the determination of the disk type among the operations in the microcomputer used in the system controller in FIG. 2.

In FIG. 11 which shows the fourth embodiment, the peak duration is used for the comparison between the peaks, and then the voltage value is not used therefor. In FIG. 11, if YES at a step 30A, the focus search is started in a direction opposite to the focus search direction at the previous step S15A. Contents of registers in which peak durations T1, T2 and T3 are respectively stored are set to 0, and then a timer is started. Next, digital values obtained by A/D converting the voltages of the sum all signals SA are sequentially read in at a step S56, and are sequentially stored in predefined A/D conversion registers, and then are sequentially compared with a previous value. At a step S57, it is judged whether or not a peak value is detected as the sequential comparison results at the step S56. If YES, the peak duration is stored in a T1 register at a step S58. If NO, the operational flow returns to the step S56. After the operation at the step S57 is finished, the A/D conversion registers are reset at a step S59. Then, operations at steps S60, S61 similar to those at the steps S56, S57 are performed. If the peak value at a step S61, parameters are set at a step S62. Next, the focus servo control is turned on at a step S63.

Figure 13:
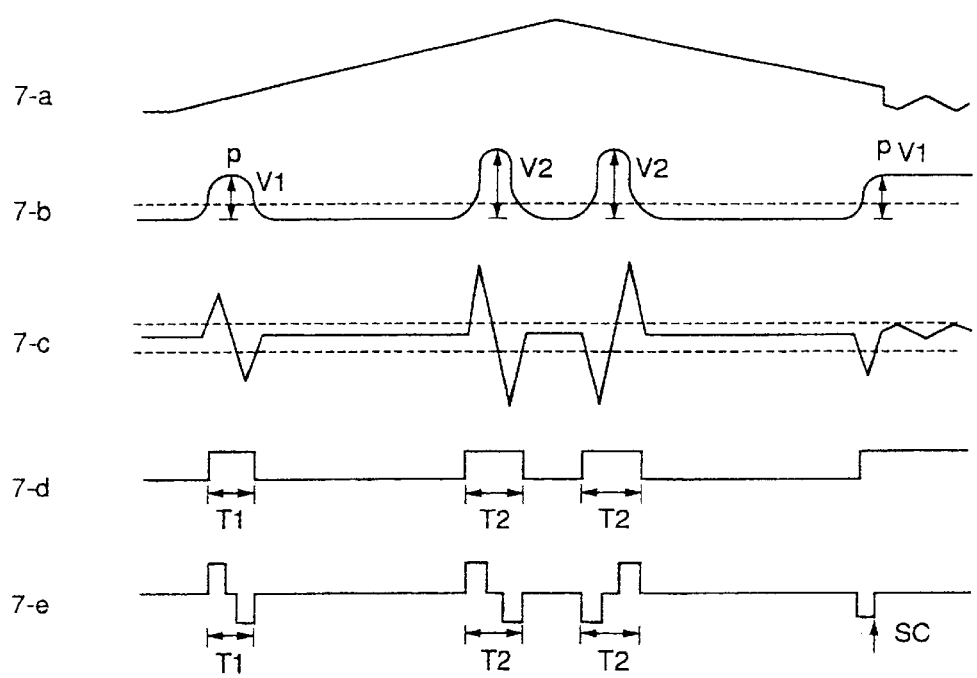
FIG. 13 is a diagram showing waves when the focus searches are performed in a forward direction and a backward direction in the third and fourth embodiments.

FIG. 13 is a wave form diagram of explaining operations at the third and fourth embodiments. Types of signals at respective wave forms (7-a) to (7-e) correspond to the respective wave forms (3-a) to (3-e) in FIG. 5. However, the case is shown in which the focus search in both directions is performed for the disk having the thickness of 1.2 mm and then the servo control is turned on. Namely, a current (7-a) for driving the objective lens of the optical head is gradually increased, and thereby the objective lens is moved in close to the disk (the forward focus search). After that, the current is then decreased, and thereby the focus search is performed in the reverse direction. A timing SC at the wave form (7-e) shows a time point when the focus servo control is turned on. Incidentally, when the servo control is turned on at a second layer of the disk having the thickness of 0.6 mm in the third and fourth embodiments, the wave form is similar to that of FIG. 5 in the first and second embodiment.

The setting of the parameters at the step S52 or S62 in the third or fourth embodiment, in accordance with the determined disk type, sets parameters, such as a laser power of the optical head, a gain, an offset, a balance and the like in the circuit of generating the focus error signal and the tracking error signal in the preamplifier 5, and necessary parameters among items, such as switching between characteristics of an equalizer described hereinbelow in the preamplifier 5 or the DSV 6, a delay amount of a unit delay device of a transversal filter in the same preamplifier 5 or the DSV 6, a tap gain and the like.

Figure 12:
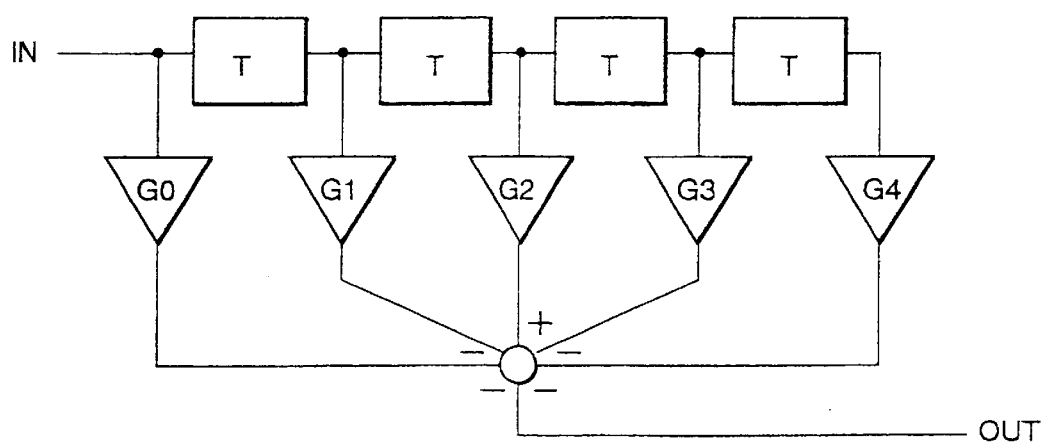
FIG. 12 is a block diagram showing a configuration of a transversal filter contained in a preamplifier or DSV in FIG. 2, and also a block diagram showing a configuration of a transversal filter as a circuit example of an equalizer in FIG. 16.

The transversal filter built in the preamplifier 5 or the DSV 6 has a structure as shown in FIG. 12. A delay time T of the unit delay device constituting the transversal filter and tap gains G0 to G4 can be controlled by using data that is stored in advance in a program ROM of a controller (not shown) based on the disk type. As an example of the T, it is possible to switch between two delay times, namely, T=440 ns in a case of CD having a thickness of 1.2 mm and T=80 ns in a case of DVD having a thickness of 0.6 mm. As an example of the tap gains G0 to G4, let G2=1, G1=G3=0.12 and G0=G4=0 in a case of the CD of 1.2 mm, and let G0=0.02, G1=0.21 G2=1, G3=02 and G4=0.02 in a case of the DVD of 0.6 mm. Moreover, let G2=1 and G0=G1=G3=G4=0 in order to remove a frequency characteristic at a time of the focus search.

Figure 16:
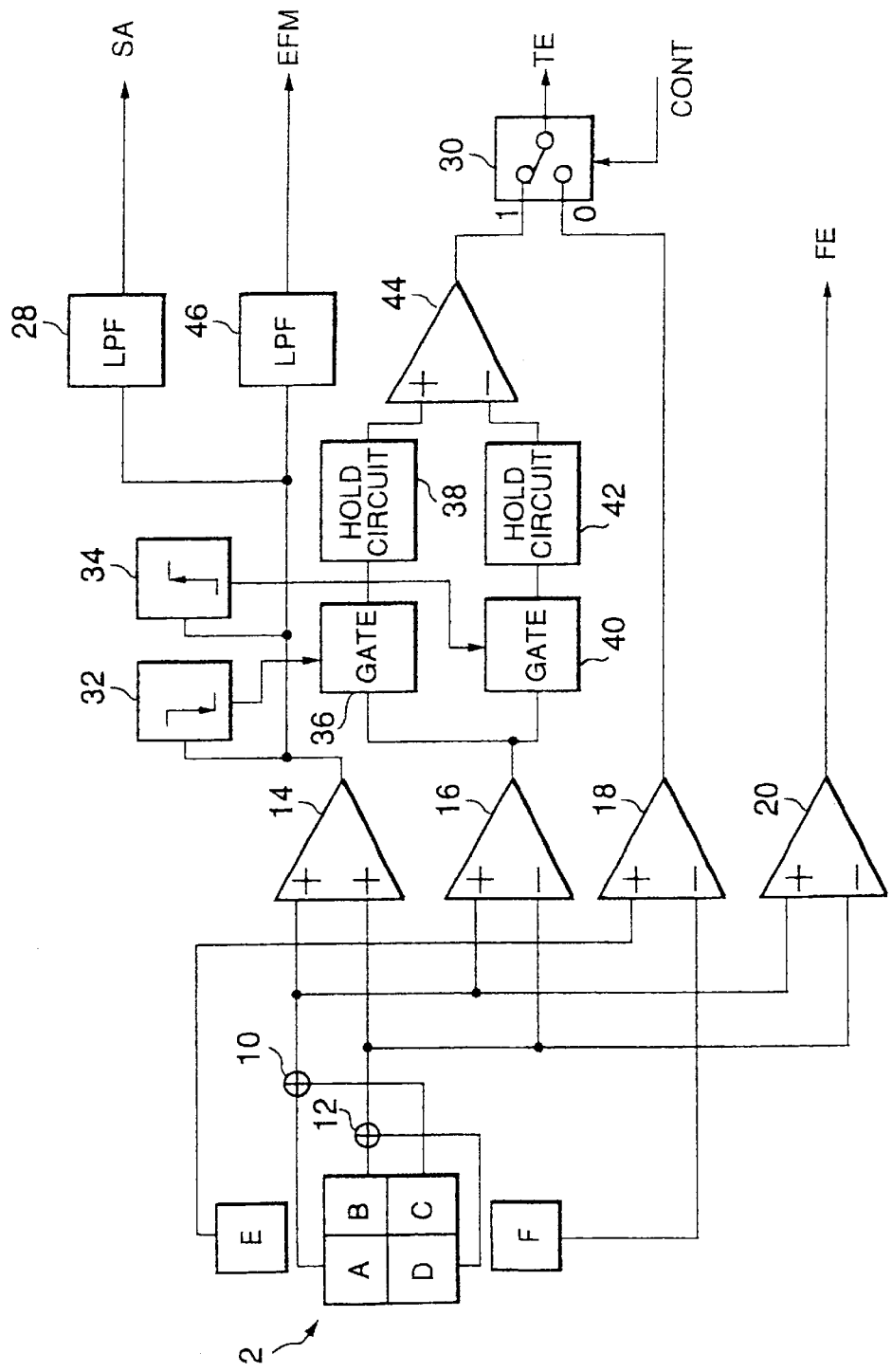
FIG. 16 is a block diagram showing a calculating circuit (one portion of the preamplifier in FIG. 2) used instead of that of FIG. 1, in the fifth embodiment of the present invention.

Next, a fifth embodiment of the present invention is explained. FIG. 16 is a block diagram showing a calculation circuit (one portion of the preamplifier in FIG. 2) used in the fifth embodiment. Incidentally, the tracking error signal may be generated by using the circuit in FIG. 1. The circuit in FIG. 16 uses a circuit shown in FIG. 4 in Japanese Patent Application Laid open No. 57-74837 Gazette. In FIG. 16, parts having the same reference numerals as those in FIG. 1 denote the same parts in FIG. 1. The portions different from the case in FIG. 1 are explained below. Namely, gate circuits 36, 40, which are respectively controlled by a trailing edge pulse generating circuit 32 and a leading edge pulse generating circuit 34 that respond to an output signal of an adder 14, gate an output signal of a subtracter 16. Then, output signals of the gate circuits 36, 40 are respectively given to hold circuits 38, 42. Output signals of the hold circuits 38, 42 are respectively given to (+) and (−) input terminals of a subtracter 44. Then, an output signal of the subtracter 44 is given to a terminal on a side 1 of a switch 30. Moreover, the output signal of the adder 14 is outputted as a sum all signal (SA) and an EFM signal or an EFM plus signal through an LPF 28 and an equalizer (EQ) 46, respectively.

Hence, when a side 0 of the switch 30 is selected by the control signal CONT from the microcomputer, the tracking error signal of the three-beam method is outputted similarly to the case in FIG. 1. When a side 1 is selected, a tracking error signal similar to that shown in FIG. 4 in the above mentioned Japanese Patent Application Laid-open No. 57-74837 Gazette is selected. This tracking error signal corresponds to, a process, in which a difference signal (the output signal of the subtracter 16) is sampled at both the edges (the output signals of the trailing edge pulse generating circuit 32 and the leading edge pulse generating circuit 34) of the sum all signal (the output signal of the adder 14) and thereby a value having a momentary peak-to-peak value of the difference signal to which a sign corresponding to a deviation direction from a track of a beam spot is affixed (refer to FIG. 5 of the above mentioned gazette).

Figure 15:
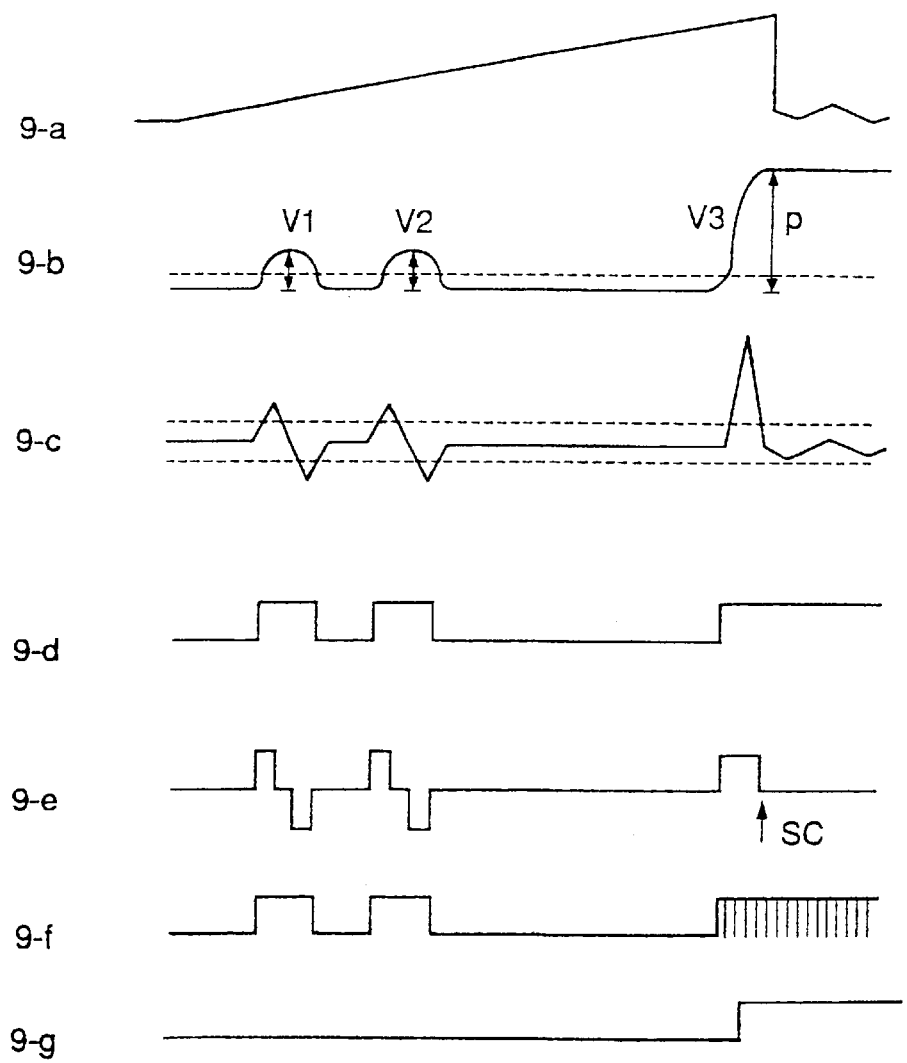
FIG. 15 is a wave form diagram showing various signal waves obtained from output signals when the focus search is performed in a fifth embodiment of the present invention.

FIG. 15 corresponds to FIG. 4. In FIG. 15, a portion in which fine lines are crowded shows a high frequency element HF. In FIG. 15, (9-a) shows a voltage applied to a focus coil, (9-b) shows a sum all signal SA, (9-c) shows a focus error signal, (9-d) shows a signal obtained by comparing the sum all signal SA with a threshold, (9-e) shows a signal obtained by comparing the focus error signal (9-c) with a predefined threshold, (9-f) shows a signal obtained by comparing the EFM signal with a standard value Ref in a comparator 50 and (9-g) shows HFDET (an output signal of D-FF56) in FIG. 17. A timing SC in the wave form (9-e) shows a time point when the focus servo control is turned on.

Figure 17:
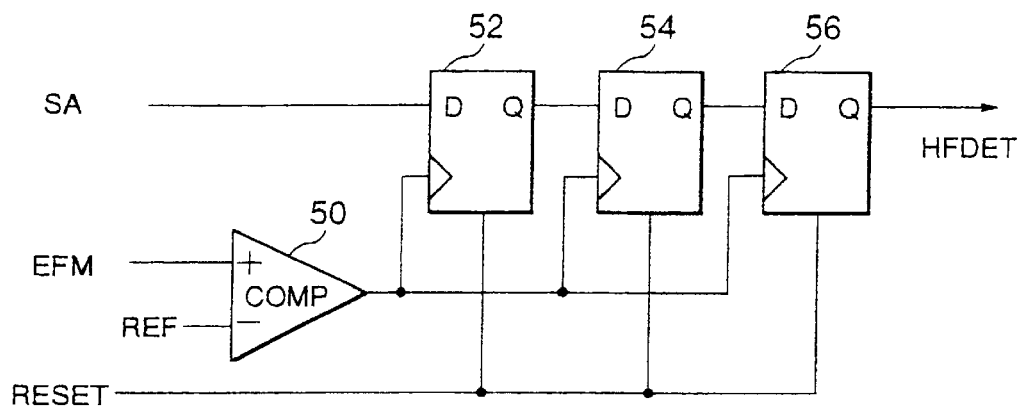
FIG. 17 is a block diagram showing one example of a circuit for detecting a high frequency element HF by using a sum all signal SA and an EFM signal among output signals form the circuit in FIG. 16.

FIG. 17 is a block diagram showing one example of a circuit for detecting the high frequency element HF by using the sum all signal SA and the EFM signal, among the output signals of the circuit in FIG. 16. The EFM signal is sent to the comparator 50, and then compared with the standard signal Ref. The sum all signal SA is sent to a D input of the D-FF (flip-flop) 52, whose Q output is sent to a D input of a next stage D-FF 54 whose Q output is sent to a D input of a still next stage D-FF 56, whose Q output is outputted as a detection signal, HFDET. The output signal of the comparator 50 is given as a clock for the respective D-FFs 52 to 56. Reset is a reset signal for the respective D-FFs 52 to 56.

The output signal from the comparator 50 in the circuit of FIG. 17, namely, the signal after the comparison of the EFM signal is shown as (9-f) in FIG. 15. The D-FFs 52 to 56 count a pulse of the output signal from the comparator 50 only when the signal (9-d) generated by re-shaping the wave form of the sum all signal SA is in H (a high level). In this example, the output signal HFDET (9-g) from the D-FF 56 becomes in H if three counts are performed. Unless the three counts can not be performed within this section, a counter composed of the D-FFs 52 to 56 is reset by the sum all signal SA and the like. Although the count number is assumed to be three in this example, this count number can be properly set to a predefined number.

Figure 18:
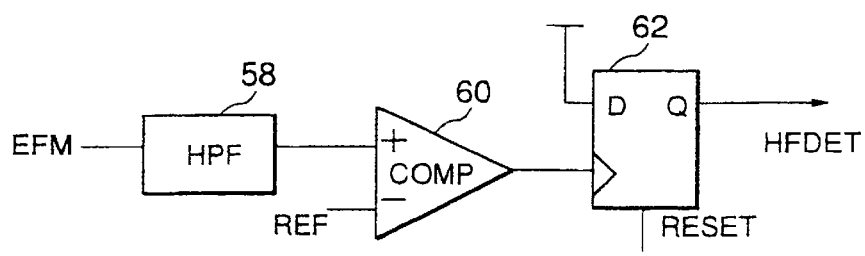
FIG. 18 is a block diagram showing another example of the circuit for detecting the high frequency element HF by using the EFM signal among the output signals from the circuit in FIG. 16.

FIG. 18 is a block diagram showing another example of the circuit for detecting the high frequency element HF by using the EFM signal, among the output signals from the circuit in FIG. 16. The EFM signal is sent through an HPF 58 to a comparator 60, and then compared with the standard signal Ref. An output from the comparator 60 is given as a clock of a D-FF 62 whose Q output is outputted as a detection signal HFDET. A predefined value is always given to a D input of the D-FF 62. Reset is a reset signal of the D-FF 62. The circuit in FIG. 18 extracts the high frequency element HF of the EFM signal and then latches a signal obtained by comparing the high frequency element HF with the standard value Ref. Incidentally, it is possible to use another configuration other than the circuits shown in FIGS. 17 and 18, if detecting the high frequency element. For example, the HPF may be disposed at an input portion of the counter block in FIG. 17.

The configuration of the transversal filter shown in FIG. 12 can be used as a circuit example of the equalizer 46 in FIG. 16. The delay time T of the unit delay device constituting the transversal filter and the tap gains G0 to G4 can be controlled by using the data that is stored in advance in the program ROM of the controller (not shown) based on the disk type. As an example of the T, it is possible to switch between two delay times, namely, T=440 ns in a case of CD having a thickness of 1–2 mm and T=80 ns in a case of DVD having a thickness of 0.6 mm. As an example of the tap gains G0 to G4, let G2=1, G1=G3=0.12 and G0=G4=0 in a case of the CD of 1.2 mm, and let G0=0.02, G1=0.2, G2=1, G3=0.2 and G4=0.02 in a case of the DVD of 0.6 mm. Moreover, let G2=1 and G0=G1=G3=G4=0 in order to remove a frequency characteristic at a time of the focus search.

An operation of a configuration into which the structures in FIG. 16 and FIG. 17 are combined is explained. After the power supply of the reproducing apparatus is turned on, the spindle (SP) motor 3 is actuated, and then the focus search is started. Namely, the voltage applied to the focus coil is gradually increased as shown at (9-a) in FIG. 15. The sum all signal SA is A/D converted and then inputted to the microcomputer. The sum all signal ((9-b) in FIG. 15) is read in, and simultaneously the output signal HFDET in FIG. 17 ((9-g) of FIG. 15) is monitored.

At a time point t (corresponding to a nearly zero cross point of a so-called S curve in the focus search) when the sum all signal SA exceeds the predefined value, and also the signal HFDET becomes in H and further the signal (9-e) obtained by comparing the focus error signal ((9-c) in FIG. 15) with the predefined value is changed from H to L (low level) by monitoring the signal (9-e), the focus servo control is turned on. Moreover, several parameters of the reproducing apparatus resulting from the difference between reflection coefficients of the respective disks, for example, the laser power of the optical head, the gain, the offset and the balance in the circuit of generating the focus error signal and the tracking error signal, the delay time of the unit delay device, the tap gain and the like are set, and then the reproducing process is performed.

Figure 19:
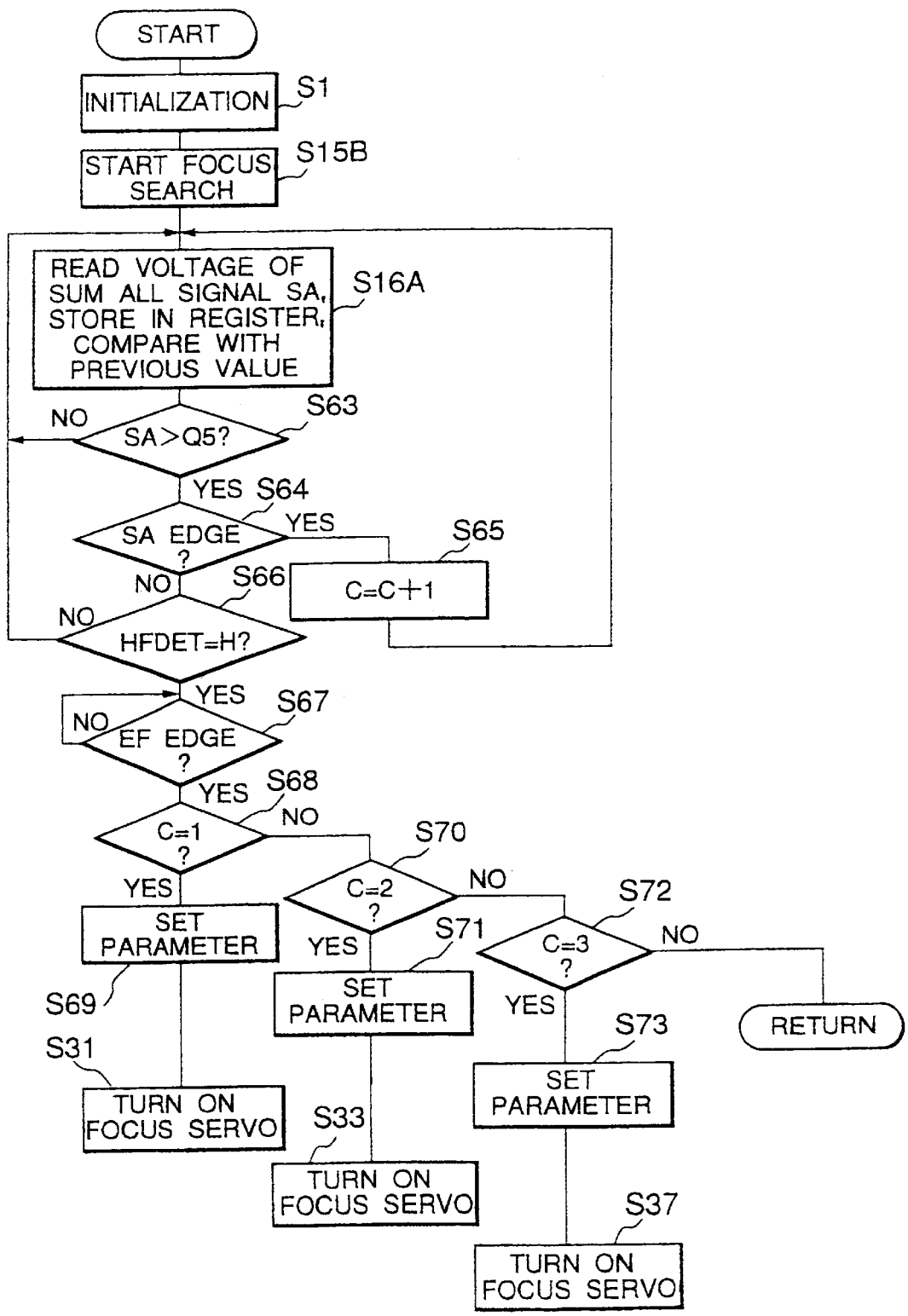
FIG. 19 is a flowchart showing one portion of a procedure (the fifth embodiment) to perform the determination of the disk type among the operations in the microcomputer used in the system controller in FIG. 2.

An operation of the fifth embodiment is explained with reference to a flowchart in FIG. 19. After an initialization at a step S1 is performed, the focus search is started at a step S15B. At a step S16A, a voltage of the sum all signal SA is read in, stored in a register and compared with a predefined value. It is judged at a next step S63 whether or not the sum all signal SA is larger than a predefined value Q5. If YES, it is judged at a step S64 whether or not an edge of the sum all signal SA is detected. If NO at the step S63, the operational flow returns to the step S16A. If the edge of the sum all signal SA is detected at the step S64, a count C of a counter is incremented by one at a step S65, and then the operational flow returns to the step S16A. On the other hand, if the edge of the sum all signal SA is not detected at the step S64, it is judged at a step S66 whether or not the HFDET is H. If NO, the operational flow returns to the step S16A. If YES, it is judged at a step S67 whether or not an edge of the focus error signal FE is detected.

Figure 14:
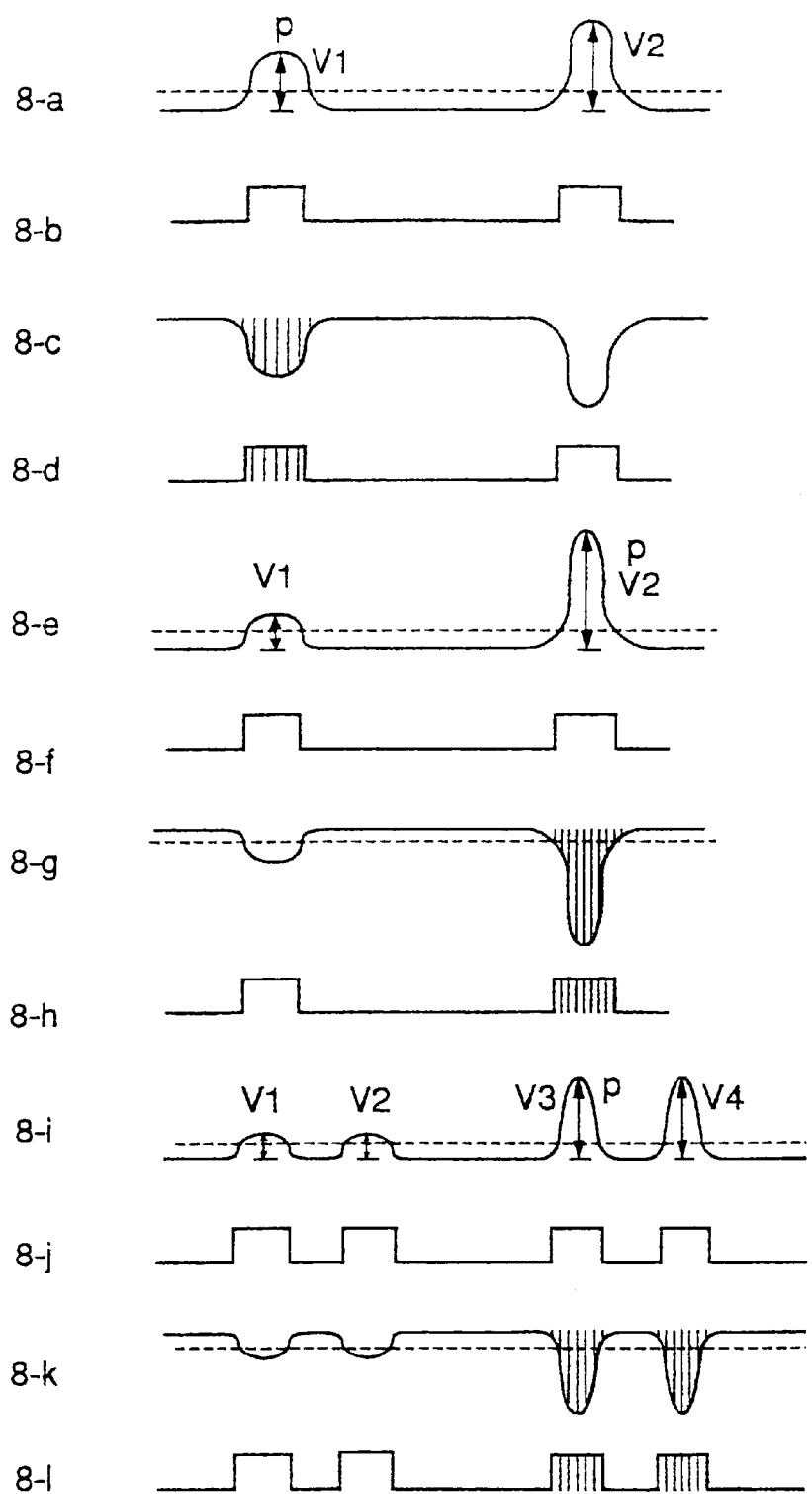
FIG. 14 is a wave form diagram showing various signal waves obtained from output signals when the focus search is performed by the optical pickup in accordance with FIG. 3.

When the edge of the focus error signal FE is detected, it is judged at a step S68 whether or not the counter C is 1. If 1, the mounted disk is determined as CD. Then, parameters suitable for the CD are set at a step S69. Next, the focus servo control is turned on at a step S31. Unless C=1, it is judged at a step S70 whether or not C=2. If 2, the mounted disk is determined as a disk on a first layer of DVD. Then, parameters suitable for it are set at a step S71. Next, the focus servo control is turned on at a step S33. Unless C=2, it is judged at a step S72 whether or not C=3. If 3, the mounted disk is determined as a first layer of a two-layer disk of DVD. Then, parameters suitable for it are set at a step S73. Next, the focus servo control is turned on at a step S37. The reason why it is possible to determine the disk type on the basis of the number of the count C is that a relation between the peak number of the sum all signals SA obtained in the focus search and the timing at which the high frequency element in the EFM signal is kept constant in accordance with the disk type, as shown in FIG. 14.

The similar operation can be performed even if a configuration into which the structures in FIG. 16 and FIG. 18 are combined, instead of the configuration into which the structures in FIG. 16 and FIG. 17 are combined. By preparing a comparator having a plurality of thresholds for converting the sum all signal SA into a binary value in the above mentioned respective configurations, it is also possible to detect a disk of write-once type or a disk of recording and reproducing type in which levels of sum all signals SA are different due to a difference between reflection coefficients. The above mentioned operations are explained for the cases of applying to the CD dedicated to the reproduction and the one layer type DVD.

Figure 20:
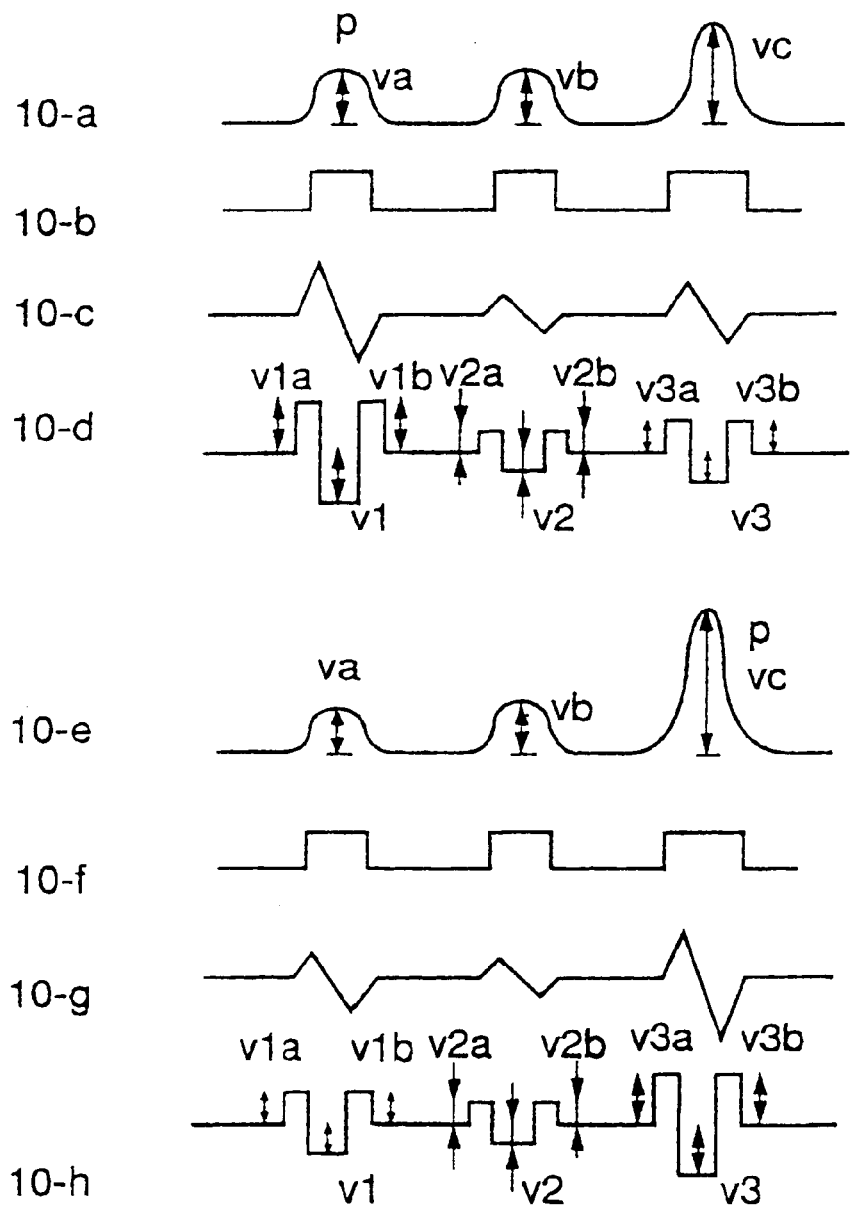
FIG. 20 is a wave form diagram showing various signal waves obtained from output signals when the focus search is performed by the optical pickup in accordance with FIG. 3.

Next, a sixth embodiment of the disk type determining apparatus and the optical disk reproducing apparatus of the present invention is explained. This embodiment uses the circuit in FIG. 1 or FIG. 16. At first, an operational principle is explained with reference to FIG. 20. Now, the beam-collecting state to the disk 1 in the two-focus type of the optical pickup is assumed to be shown in FIG. 3 as mentioned above. FIG. 20 shows a signal detected when the focus search is performed by moving the objective lens in close to the optical disk, in accordance with the above mentioned condition. In signal wave forms in FIG. 20, signals (10-a) to (10-d) correspond to the disk at (1-a) in FIG. 3, and signals (10-e) to (10-h) correspond to the disk at (1-b) in FIG. 3, respectively. Moreover, α at (1-a) in FIG. 3 corresponds to a point va at (10-a) in FIG. 20, and β corresponds to a point vc. A point vb in FIG. 20 indicates a signal resulting from a pseudo signal of the two-focus pickup. Similarly, α at (1-b) in FIG. 3 corresponds to a point va at (10-e) in FIG. 20, and β corresponds to a point vc. A point vb in FIG. 20 indicates a signal resulting from a pseudo signal of the two-focus pickup. The sum all signal SA in FIG. 1 or FIG. 16 is (10-*a*) and (10-*e*) in FIG. 20, and a signal obtained by comparing the sum all signal SA with the predefined standard value is (10-*b*) and (10-*f*). Moreover, the focus error signal FE is (10-*c*) and (10-*g*), and a signal obtained by differentiating it is (10-*d*) and (10-*h*). Incidentally, these wave forms are diagrammatically shown. Then, they are not limited to these wave forms.

Now, for the two focuses, at (10-*a*), (10-*b*), (10-*c*) and (10-*d*) in FIG. 20, it is understood that as for an amplitude at (10-*a*), the point vc is larger than a point p at (10-*a*) at which the focus servo control is turned on (hereinafter, simply referred to as [servo-on]) in a case of the disk of 1.2 mm, while an amplitude at (10-*d*) that implies a gradient of the S curve of the focus error signal FE is the largest at a point v1. Simultaneously, although not evident in this figure, a relation between upper and low portions of the S curve is the most symmetrical at a point va at (10-*c*). It is not so symmetrical at points vb and vc. Then, the disk type can be determined more evidently by comparing levels at points v1a and v1b in addition to the point v1 with those at the other points vb and vc.

At (10-*e*), (10-*f*), (10-*g*) and (10-*h*) in FIG. 20, as for an amplitude at (10-*e*), a point vc is larger than a point p at (10-*e*) at which the servo is turned on in a case of the disk of 0.6 mm, and an amplitude at (10-*h*) that implies a gradient of the S curve of the focus error signal FE is the largest at a point v3. Besides, although not evident in this figure, a relation between upper and low portions of the S curve is the most symmetrical at a point vc at (10-*g*). It is not so symmetrical at points va and vb. Then, the disk type can be determined more evidently by comparing levels at points v3a and v3b in addition to the point v3 with those at the other points va and vb. This is because it can be found out that the spot is unclear because of the aberration and other factors in the pseudo spot, as compared with the original spot.

In the transversal filter which coresponds to the equalizer in FIG. 16 (the T of the unit delay device can be switched between two delay times, namely, T=440 ns in a case of CD having a thickness of 1.2 mm and T=80 ns in a case of DVD having a thickness of 0.6 mm) built in the preamplifier 5 in FIG. 2, the tap gains thereof are similarly stored in advance in the program ROM of the controller, for example, such that a gain of G2 is 1, G1=G3=0.12 and G0=G4=0 in a case of the CD of 1.2 mm, and for example, such that G0=0.02, G1=0.2, G2=1, G3=0.2 and G4=0.02 in a case of the DVD of 0.6 mm, and further such that G2=1 and G0=G1=G3=G4=0 in order to remove a frequency characteristic at a time of the focus search.

Figure 21:
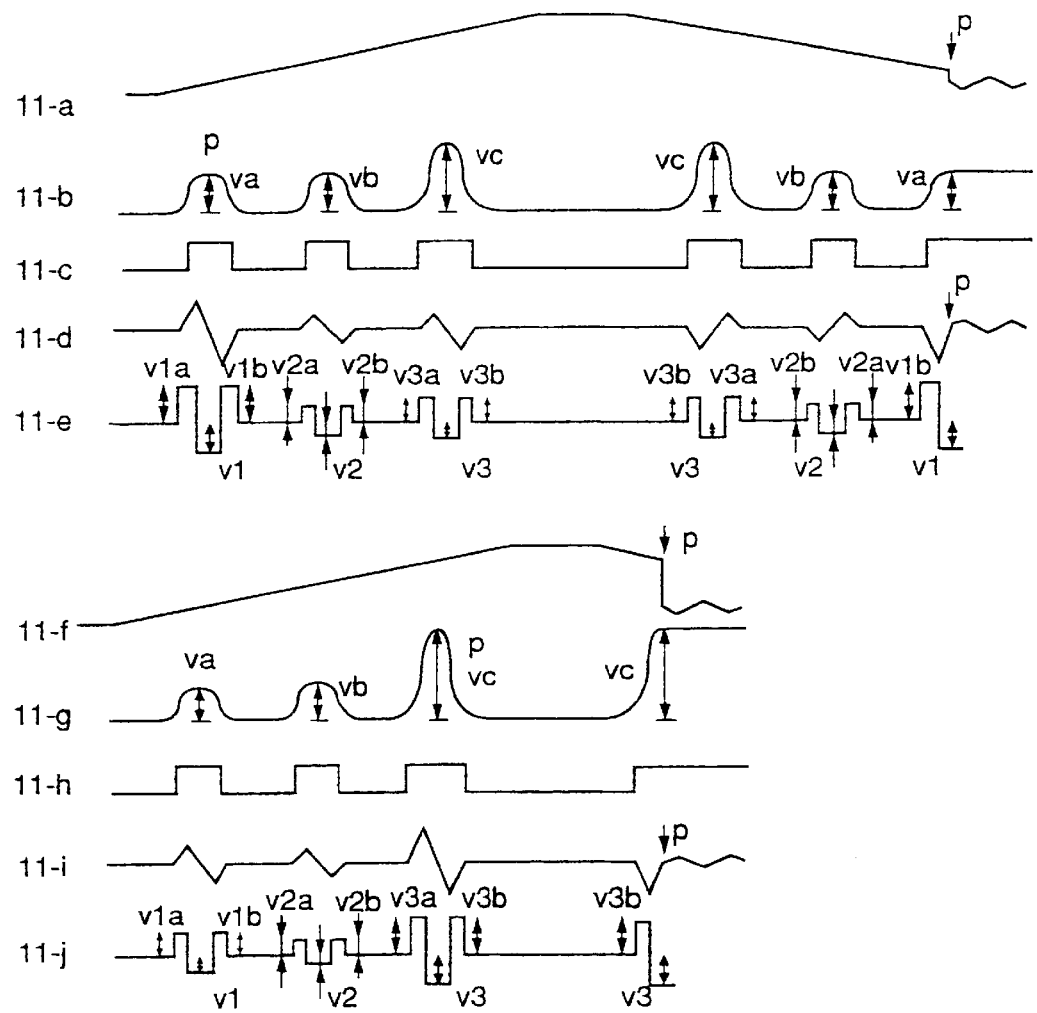
FIG. 21 is a diagram of respectively showing waves in the focus searches in two types of disks.

An actual operation of the sixth embodiment is explained with reference to FIG. 21. Signal wave forms (11-*b*), (11-*c*), (11-*d*) and (11-*e*) in FIG. 21 correspond to (10-*a*), (10-*b*), (10-*c*) and (10-*d*) in FIG. 20, and signal wave forms (11-*g*), (11-*h*), (11-*i*) and (11-*j*) in FIG. 21 correspond to (10-*e*), (10-*f*), (10-*g*) and (10-*h*) in FIG. 20, respectively. Also, references (11-*a*) and (11-*f*) in FIG. 21 show variations of the voltages applied to the focus coil. In the whole block in FIG. 2, the sum all signals SA which are shown at (11-*b*) and (11-*g*) in FIG. 21 and generated by the preamplifier 5 and the focus error signals FE which are shown at (11-*d*) and (11-*i*) in FIG. 21 and generated by the preamplifier 5 are sampled by the A/D converter in the DSV 6, and then inputted as the digital signal to CPU of the system controller 7. While the sum all signals SA exceed predefined thresholds from a time point when the voltage applied to the focus coil is increased and the focus search is started (refer to (11-*a*) and (11-*f*)) (H level sections at (11-*c*) and (11-*h*) in FIG. 21), (11-*d*) and (11-*i*) in FIG. 21 are sampled, and then signals indicative of differences from the previously sampled values, namely, amplitudes of the signals (11-*e*) and (11-*j*) which imply differential signals are stored. Actually, since the sum all signals (11-*b*) and (11-*g*) are A/D converted and then processed as the digital signals, the signals (11-*c*) and (11-*h*) are diagrammatically timing signals that are not outputted as the signals. Moreover, the signals (11-*e*) and (11-*j*) are diagrammatical signals which are not outputted as the signals, since the A/D conversion values are differentiated.

After the amplitudes of the signals (11-*e*) and (11-*j*) are stored, it is determined which of the signals at the v1, the v2 and the v3 in the H level sections in the three peaks va, vb and vc during the search operation (or in the relation between v1v1av1b, v2v2av2b and v3v3av3b) is maximum. If the result is the v1, the disk is determined as CD. If the v3, the disk is determined as DVD. Then, the focus servo is performed in the reverse direction. The servo-on process is performed at a time point when the focus error signals FE at (11-*d*) and (11-*i*) are reached to the standard voltage, in the target va or vc. Incidentally, together with the servo-on process, or before the servo-on process, the respective parameters (the gain in the preamplifier, the laser power, the offset, the balance, the delay amount of the unit delay device of the transversal filter, the tap gain value and the like) are set in a servo block (not shown) in accordance with the determined disk type, and then the reproduction processes on and after the focus servo-on are performed.

Figure 22:
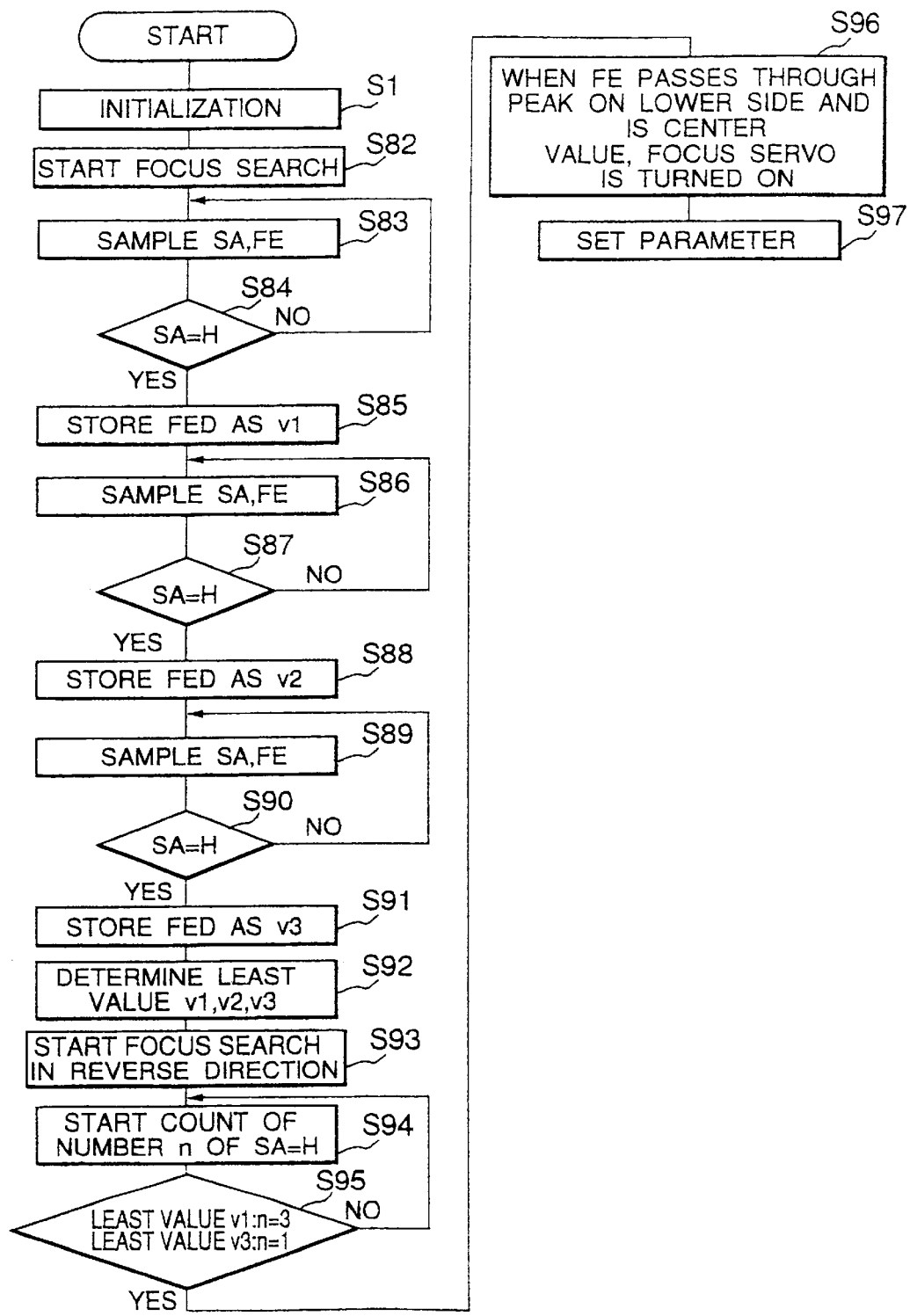
FIG. 22 is a flowchart showing a procedure (a sixth embodiment) to perform the determination of the disk type among the operations in the microcomputer used in the system controller in FIG. 2.

Next, an actual operation of the sixth embodiment is explained with reference to a flowchart in FIG. 22. At first, predefined registers and the like are reset at an initialization (Step S1). The voltage applied to the focus coil is increased in order to start the forward focus search (Step S82). When the focus search is started, the sampling operations are performed for the A/D conversions of the sum all signal SA and the focus error signal FE (Step S83). Next, it is judged whether or not the sum all signal SA is H (high) as compared with a predefined value (Step S84). If H, the least value= FED of values in which present values are subtracted from previous values of the focus error signals FE is stored as v1 in a memory (Step S85). If not H, the operational flow returns to the step S83.

Operations at subsequent steps S86 to S88 and at steps S89 to S91 still subsequent thereto are similar to those at the steps S83 to S85. Then, the least values FED of values in which present values of the FE are subtracted from previous values of the FE are stored as v2 and v3, respectively. After the three least values v1, v2 and v3 are stored as mentioned above, the least value of the three least values v1, v2 and v3 is determined at a step S92. For example, the least value is the v1 at (11-*a*), (11-*b*), (11-*c*), (11-*d*) and (11-*e*) in FIG. 21, and the v3 at (11-*f*), (11-*g*), (11-*h*), (11-*i*) and (11-*j*) in FIG. 21. After this determination, the voltage applied to the focus coil is decreased, and then the focus servo is started in the reverse direction (Step S93). A count of a number n when the sum all signal SA is H is started at a step S94. The operational flow proceeds to a step S96 when n=3 if the least value is the v1, or when n=1 if the least value is the v3. The operational flow returns to the step S94 when they do not meet with these conditions.

The focus error, signal FE is measured at a step S96, and then when it passes through the peak on a low side and becomes a standard voltage (a center value), the focus servo control is turned on. A count value of an SA counter for counting the number of SA=H is checked at a next step S97. If n=3, the v1 has the least value. Thus, the mounted disk is determined as CD. On the other hand, if n=1, the v3 has the least value. Thus, the mounted disk is determined as DVD. Parameters (the gain in the preamplifier, the laser power, the offset, the balance, the delay amount of the unit delay device of the transversal filter, the tap gain value and the like) are set in a servo block (not shown) in accordance with the determined disk type.

Since the count is 3 in the example of the wave forms (11-*a*), (11-*b*), (11-*c*), (11-*d*) and (11-*e*) in FIG. 21, it is assumed to use the transversal filter (the T of the unit delay device is 80 ns in a case of DVD of 0.6 mm). Then, the tap gains thereof are set to the values for the disk of 0.6 mm, for example, G0=0.02, G1=0.2, G2=1, G3=0.2 and G4=0.02. After the parameters are set at a step S97, the normal reproduction processes on and after the focus servo is turned on are performed.

In the sixth embodiment, the differential signals (11-*e*) and (11-*j*) are obtained as the differences between the digital signals after the A/D conversions of the focus error signals FE. However, an embodiment (a seventh embodiment) may be considered in which the focus error signal FE prior to the A/D conversion is differentiated through an analog differentiating circuit, and then the signal after the differentiation is A/D converted.

In the sixth embodiment, only the voltages v1, v2 and v3, namely, only the peak values lower than a 0 level (negative peak values) are compared with each other. However, it is possible to judge whether or not the symmetry of the S curve is excellent by incorporating the positive voltages v1a and v1b, namely, the peak values higher than the 0 level into the comparison target. A detection accuracy can be improved by using such a method. In an eighth embodiment as one example, (v1+v1a+v1b), (v2+v2a+v2b) and (v3+v3a+v3b) are compared with each other. In this case, for example, only when both the v1a and the v1b exceed a certain threshold level, a level of the v1 is determined. For example, if any one of the v3a and the v3b does not exceed a certain threshold, it is not different from the original spot, and thereby the v3 is set to 0. Hence, it is possible to protect an erroneous detection.

The voltages v1, v2 and v3 indicative of the gradients of the respective peaks are detected in the sixth through the eighth embodiments. However, it is possible to use predefined voltage thresholds higher or lower than the wave forms (3-*e*) and (3-*j*) to thereby measure a time while the determined voltage threshold is exceeded. Such a variation implementation is a ninth embodiment. Namely, since the focus error signal FE of the original spot is steeper in gradient than the pseudo signal, it has the characteristic that the time while the threshold is exceeded is shorter than the corresponding time in the pseudo signal. The original light spot can be measured accurately and stably by using the characteristic.

The processing of the pseudo signal detected at a spot other than the two light spots of the two focuses as disclosed in the Japanese Patent Application Laid-open No. 7-98431 Gazette is omitted in the above mentioned respective embodiments. However, for example, when there is a signal having a level intermediate between the V1 and the V2 between the peak values V1 and V2 in the wave forms (2-*a*) and (2-*e*) in FIG. 4, the wave forms (6-*a*) and (6-*e*) in FIG. 9, the wave form (7-*a*) in FIG. 13 and the wave forms (8-*a*) and (8-*e*) in FIG. 14, or when there is a signal having a level intermediate between the V2 and the V3 between the peak values V2 and V3 in the wave form (2-*i*) in FIG. 4, the wave form (3-*b*) in FIG. 5, the wave form (6-*i*) in FIG. 9, the wave form (7-*a*) in FIG. 13, the wave form (8-*i*) in FIG. 14 and the wave form (9-*b*) in FIG. 15, the peak levels at the two through four peaks or the time widths are measured in the first through fourth embodiments. However, it is possible to similarly measure the pseudo signal to thereby compare a level ratio or a time width ratio, including this measured value. In this case, although the calculation is slightly complex, there may be a case that the accuracy of the disk determination is improved. Moreover, the disk type is determined by using the number of the peak signals and the detection timing of the high frequency element in the fifth embodiment. However, in a case of the pseudo signal, although the peak level can be detected, the high frequency element is not contained. Hence, it may be enough to suitably change the flowchart in FIG. 19 to thereby change the determination standard for the count value.

The microcomputer in the system controller 7 generates the control signal CONT based on the type of the disk 1, as-described below. As one method of detecting the type of the disk 1, a detection hole disposed on a cartridge of the disk 1 can be detected by a detector (not shown). A relation between the disk type to be detected and the method of generating the corresponding tracking error signal can be assumed to be one of two cases shown in a next table.

TABLE 1

|     | Three-Beam Method | Phase Difference Method |
| --- | --- | --- |
| (1) | CD With Low Record Density | DVD Disk With High Record Density |
| (2) | DVD With Single Layer | DVD With Plural Layers |

Figure 23:
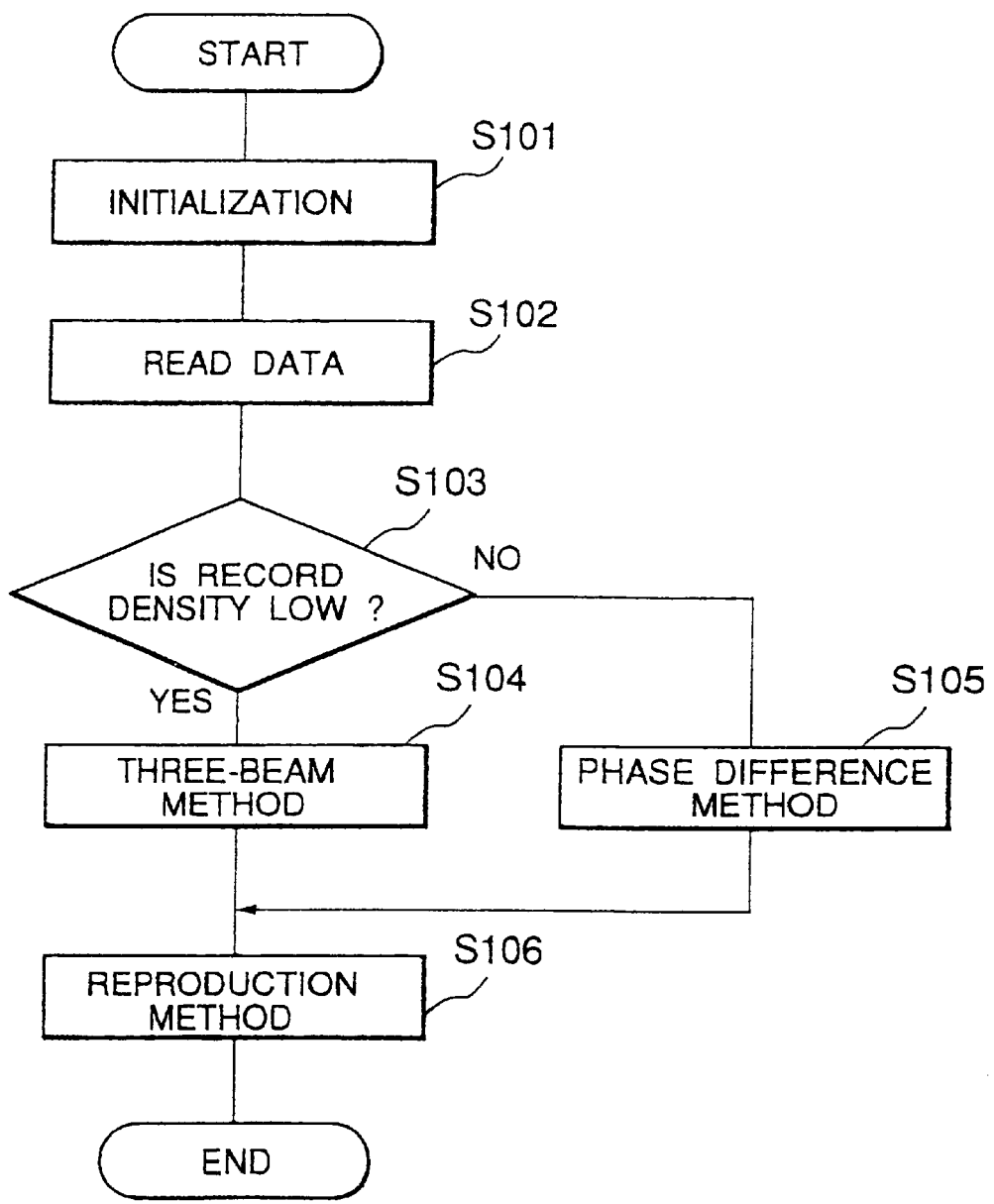
FIG. 23 is a flowchart showing a procedure to perform the determination of the disk type to thereby switch between the two types of the tracking error signals based on the determined result, among the operations in the microcomputer used in the system controller in FIG. 2.

FIG. 23 is a flowchart showing a procedure to perform the determination of the disk type to thereby switch between the two types of the tracking error signals based on the determined result, among the operations in the microcomputer used in the system controller in FIG. 2. This flowchart shows a process to use the three-beam method and the phase difference method properly, in the CD with the low record density- and the disk with the high record density in (1) in the table 1. However, the other cases in the table 1 can be processed similarly. In FIG. 23, this flow is assumed to be started when the power supply of the reproducing apparatus is turned on, the disk is exchanged or the data reproduction on the other layer is requested in the plural-layer type disk. At first, an initialization of clearing a predefined content of a memory or a buffer (not shown) connected to the microcomputer is performed at a step S101, and then necessary data is read in at a step S102.

Now, the disk is assumed to be mounted in the reproducing apparatus in a condition that it is contained in a predefined disk cartridge. Since the detection hole indicative of the disk type is disposed on the disk cartridge, data of the detection hole is assumed to be read in. Thus, it is judged from the data at a step S103 whether or not the mounted disk is the CD with the low record density. If YES, the switch 30 in FIG. 1 is connected to the side 0 so as to select the tracking error signal of the three-beam method at a step S104 and then the output signal of the subtracter 18 is outputted. On the other hand, if NO at the step S103, the switch 30 is connected to the side 1 so as to select the tracking error signal of the phase difference method at a step S105 and then the output signal of the LPF 28 is outputted.

Figure 24:
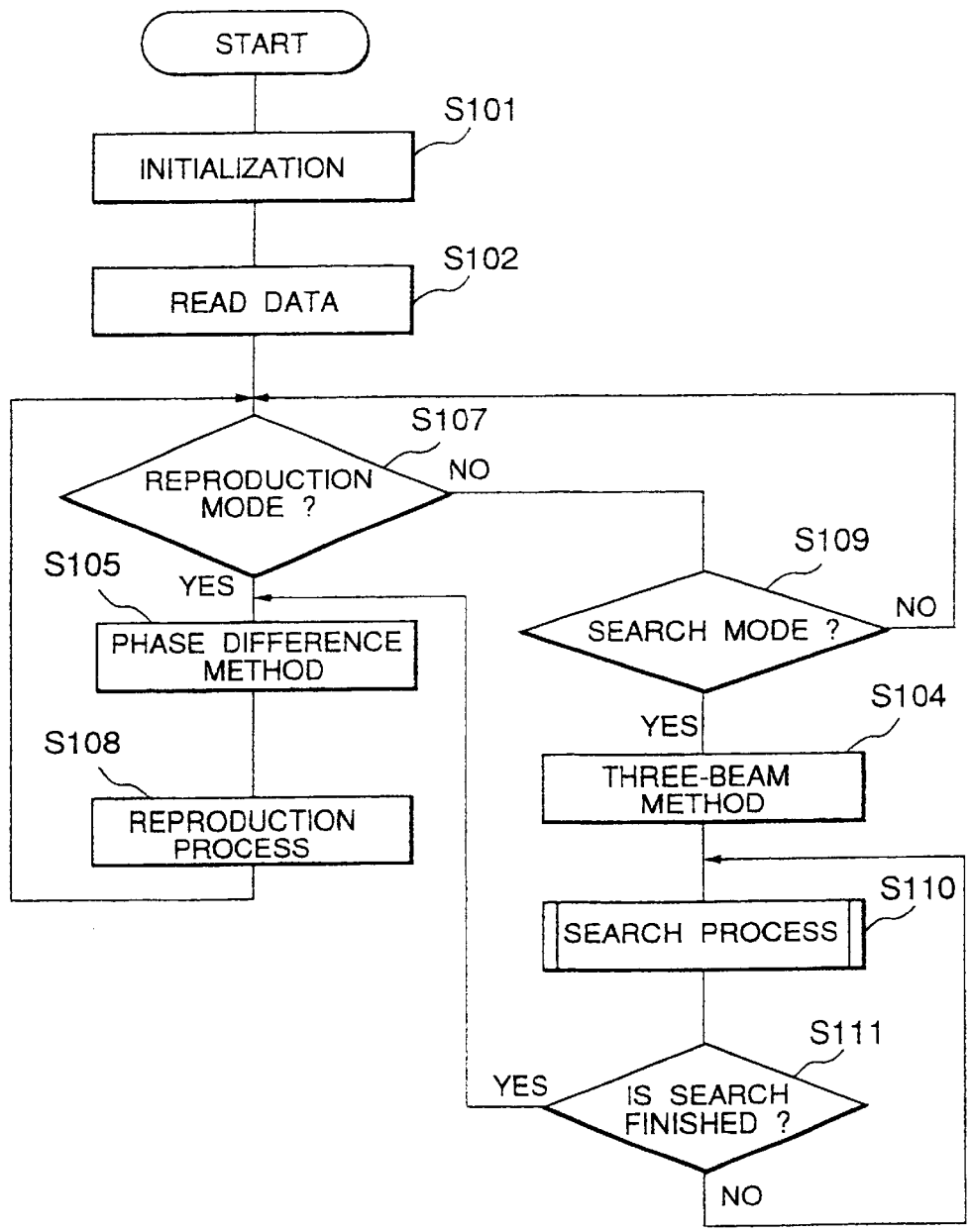
FIG. 24 is a flowchart showing one example of a procedure to switch between the two types of the tracking error signals based on an operational mode, among the operations in the microcomputer used in the system controller in FIG. 2.

FIG. 24 is a flowchart showing a procedure to determine the operational mode in the reproducing apparatus to thereby switch between the two types of the tracking error signals based on the determined result, among the operations in the microcomputer. Operations until a step S101 are similar to those in FIG. 23. However, at a step S102 in FIG. 24, an operational mode is read in which is inputted to a process section to receive an instruction from a user, which is not shown in FIG. 2. Next, it is judged at a step S107 whether or not the mode is a reproduction mode. If YES, the phase difference method is selected at a step S105, and then the reproduction process is performed at a subsequent step S108.

On the other hand, if NO at the step S107, it is judged at a step S109 whether or not the mode is a search mode. If YES, the three-beam method is selected at a step S104, and then the search process is performed at a step S110. Incidentally, "search" called here does not imply the above mentioned focus search. Then, it implies a series of the well known operations, including the operation that the optical pickup is moved in the radius direction of the disk, in order to retrieve from the disk the data or program which a user desires to read out. Next, it is judged at a step S111 whether or not the search is finished. If not finished, the operational flow returns to the step S110. If finished, it proceeds to the step S105.

Figure 25:
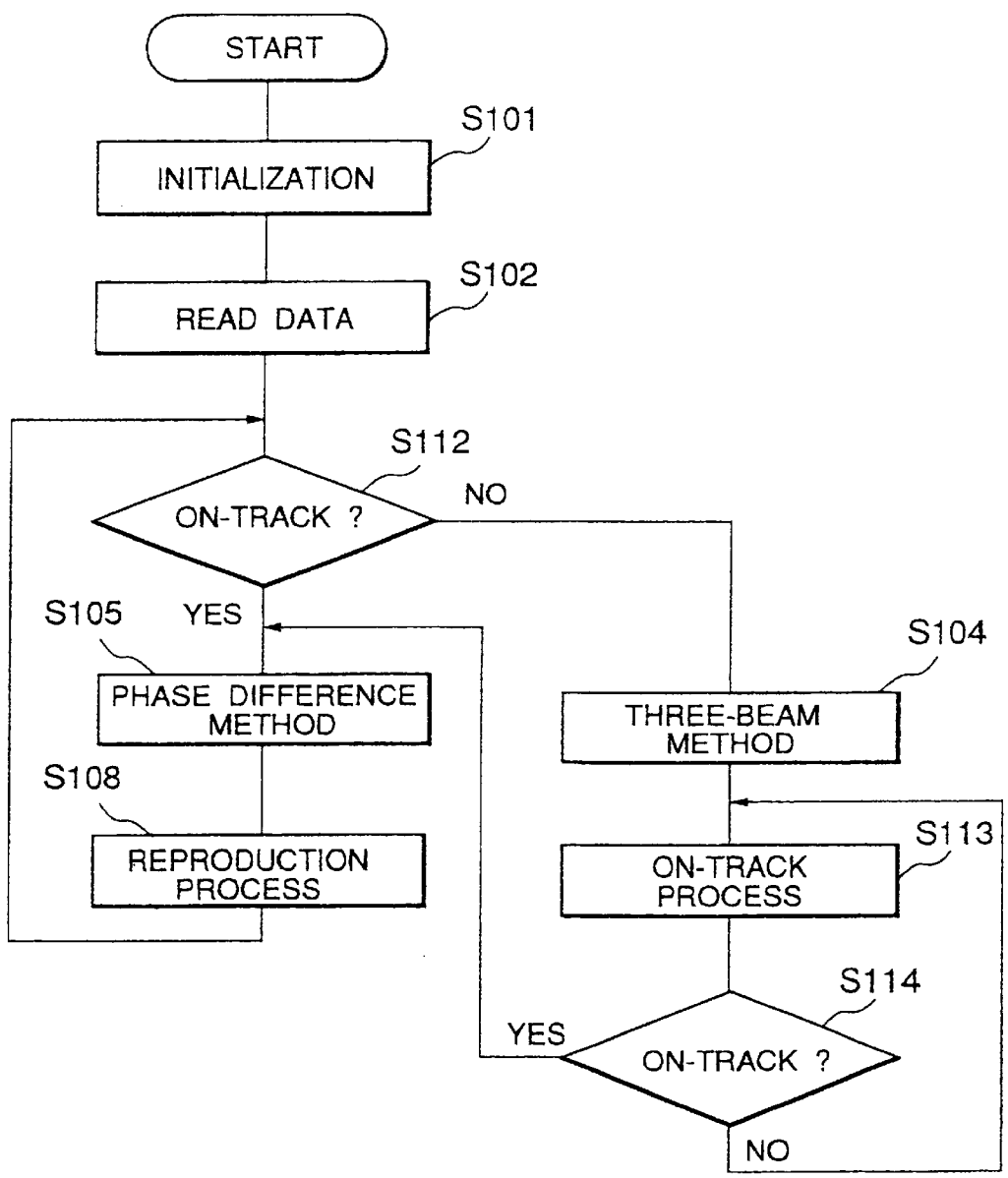
FIG. 25 is a flowchart showing another example of a procedure to switch between the two types of the tracking error signals based on a condition of on-track or non-on-track, among the operations in the microcomputer used in the system controller in FIG. 2.

FIG. 25 is a flowchart showing a procedure to judge whether or not the light spot of the optical pickup is located at a center of a track in the reproduction mode of the reproducing apparatus to thereby switch between the two types of the tracking error signals based on the judged result. Operations until a step S101 are similar to those in FIG. 23. However, at a step S102 in FIG. 25, a signal is read in which indicates whether or not a light spot from a detector (not shown in FIG. 2) is located at the center of the track. Next, it is judged at a step S112 whether or not on-track (which implies that the light spot is located at the center of the track). If YES, the phase difference method is selected at a step S105, and then the reproduction process is performed at a subsequent step S108.

On the other hand, if NO at the step S112, the three-beam method is selected at a step S104, and then the on-track process (a control of locating the light spot at the center of the track) is performed at a step S113. Next, it is judged at a step S114 whether or not the on-track process is finished. If not finished, the operational flow returns to the step S113. If finished, it proceeds to the step S105.

Figure 26:
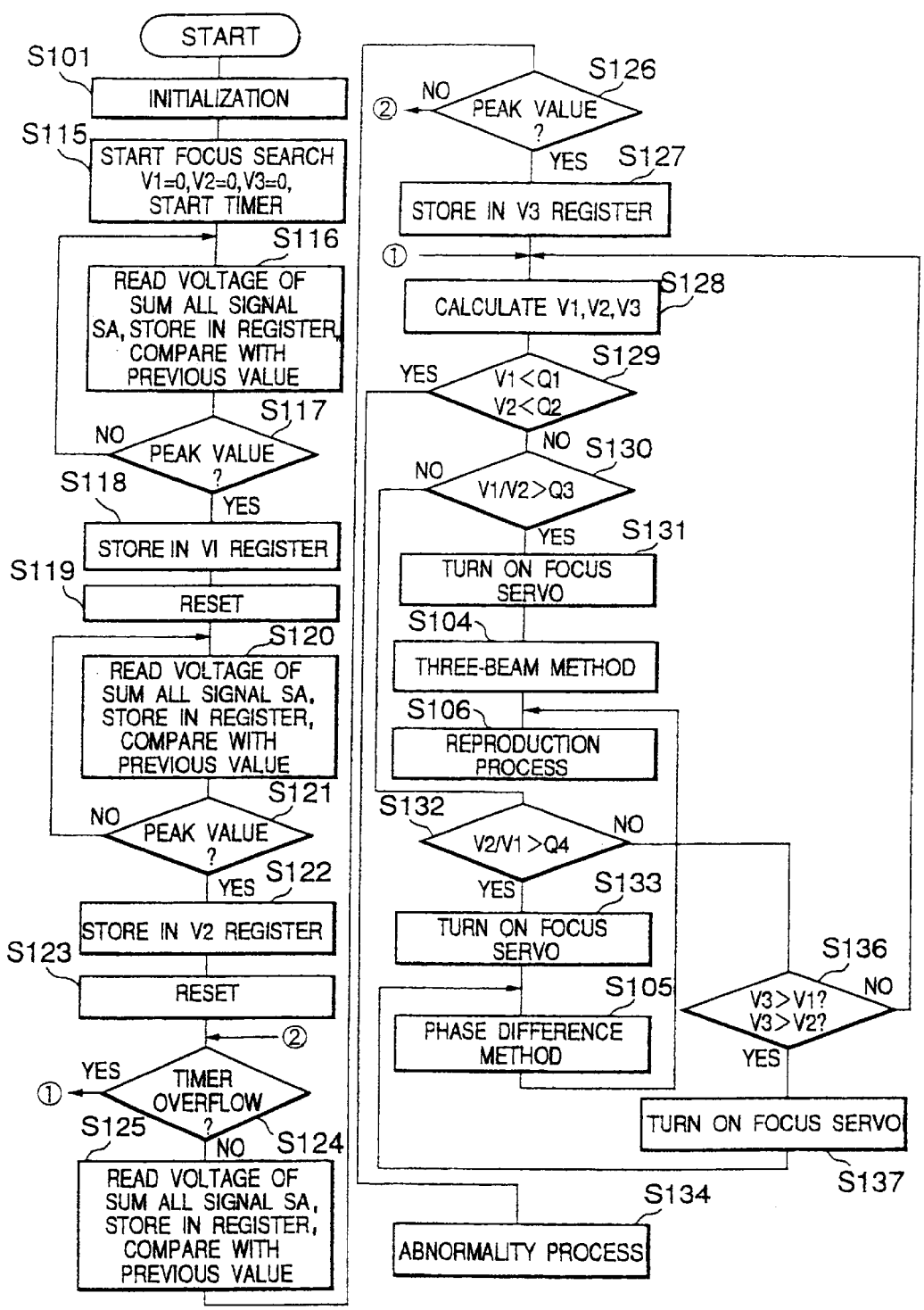
FIG. 26 is a flowchart showing one example of an operational procedure of the microcomputer to determine the disk type by means of the focus search and then control the switch 30 in FIG. 1 by using the determined result to thereby select one of the tracking error signals in the three-beam method and the phase difference method.

FIG. 26 is a flowchart showing an operational procedure of the microcomputer to determine the disk type by means of the focus search shown in FIG. 3 and FIG. 4 and then control the switch 30 in FIG. 1 by using the determined result to thereby select one of the tracking error signals of the three-beam method and the phase difference method. Operations until a step S101 are similar to those in FIG. 23. The focus search is started at a step S115. Contents of registers in which peak voltages V1, V2 and V3 are respectively stored are set to 0. Then, a timer is started. Next, digital values obtained by A/D converting the voltages of the sum all signals SA are sequentially read in at a step S116, and are sequentially stored in predefined A/D conversion registers, and then are sequentially compared with a previous value. At a step S117, it is judged whether or not a peak value is detected as the sequential comparison results at the step S116. If YES, the peak value is stored in a V1 register at a step S118. If NO, the operational flow returns to the step S116.

After the operation at the step S117 is finished, the A/D conversion registers are reset at a step S119. Then, operations at steps S120, S121 similar to those at the steps S116, S117 are performed. A next peak value is stored in the V2 register at a step S122, and the A/D conversion registers are reset at a step S123. At a next step S124, it is judged whether or not a time measured by the timer exceeds a predefined time (overflow). If exceeded, the operational flow proceeds to a step S128. If not exceeded, the operational flow proceeds to a step S125. Operations at steps S125, S126 are respectively similar to those at the steps S116, S117. Then, the peak value is stored in the V3 register at a step S127. At the step S128, comparison calculations are performed by using the respectively peak values V1, V2 and V3 obtained until that time.

At a next step S129, it is judged whether or not the V1 is smaller than a predefined value Q1 or the V2 is smaller than a predefined value Q2. If YES, the operational flow proceeds to an abnormality processing routine at a step S134. These predefined values Q1, Q2 are sufficiently smaller than the peak value obtained by the focus search in the normal disk. If NO at the step. S129, it is judged at a step S130 whether or not V1/V2>Q3 (the Q3 is a ratio of V1 to V2 that is normally obtained in the disk having the thickness of 1.2 mm, for example, a predefined value of approximately 70%: this value is varied by a design of the reproducing apparatus. Then, the ratio of V1 to V2 may be reversed because of a relation of a difference between the light quantities. This is said in the other similar comparison step). If YES at the step S130, a present disk is determined as a disk having a thickness of 1.2 mm. Then, a predefined focus servo control is turned on at a step S131, and then the tracking error signal by means of the three-beam method is selected at a next step S104. On the other hand, if NO at the step S130, it is judged at a step S132 whether or not V2/V1>Q4 (the Q4 is a ratio of V2 to V1 that is normally obtained in the disk having the thickness of 0.6 mm, for, example, a predefined value of approximately 70%).

If YES at the step S132, a present disk is determined as a disk having a thickness of 0.6 mm. Then, a predefined focus servo control is set at a step S133, and the tracking error signal by means of the phase difference method is selected at a next step S105. On the other hand, if NO at the step S132, it is judged at a step S136 whether or not V3>V1 (when the V3 is measured) and also V2>V1. If YES at the step S136, the focus servo control is turned on at a peak center point C of the wave form shown at (3-c) in FIG. 5, at a step S137. Then, the operational flow proceeds to a step S105, and the phase difference method is selected. After the steps S104, S105, the reproduction process is performed at the step S6. Although not shown, even operations of turning on the focus servo controls at the steps S131, S133 can detect the disk type during one focus search. Thus, the focus servo control can be turned on during the focus search, for example, immediately after detecting the peak voltage V2 at the wave form (2-e), and further the focus servo control can be turned on even in the focus search in a reverse direction.

The peak value V4 is not used in the flowchart in FIG. 26. The reason is described below. Namely, if the disk is determined as the two-layer disk by the detection of the V3 and by the comparison between the detected V3 and the V1 and the V2, a search time can be made short by turning on the servo control at a time point of the V3 before the V4 is detected. Although not shown especially in the flowchart of FIG. 26, parameters, such as the laser power of the optical head, the gain, the offset, the balance and the like in the circuit of generating the focus error signal and the tracking error signal, and the characteristic of the equalizer in FIG. 12 described hereinbelow are suitably switched and set in accordance with the determined disk type. Although the amplitude of the sum all signal SA is measured in this case, the voltage values (symmetric voltage values on one side or both sides) of the S curves of the signals (2-*b*), (2-*f*) and (2-*j*) that are the focus error signals FE may be similarly measured.

Figure 27:
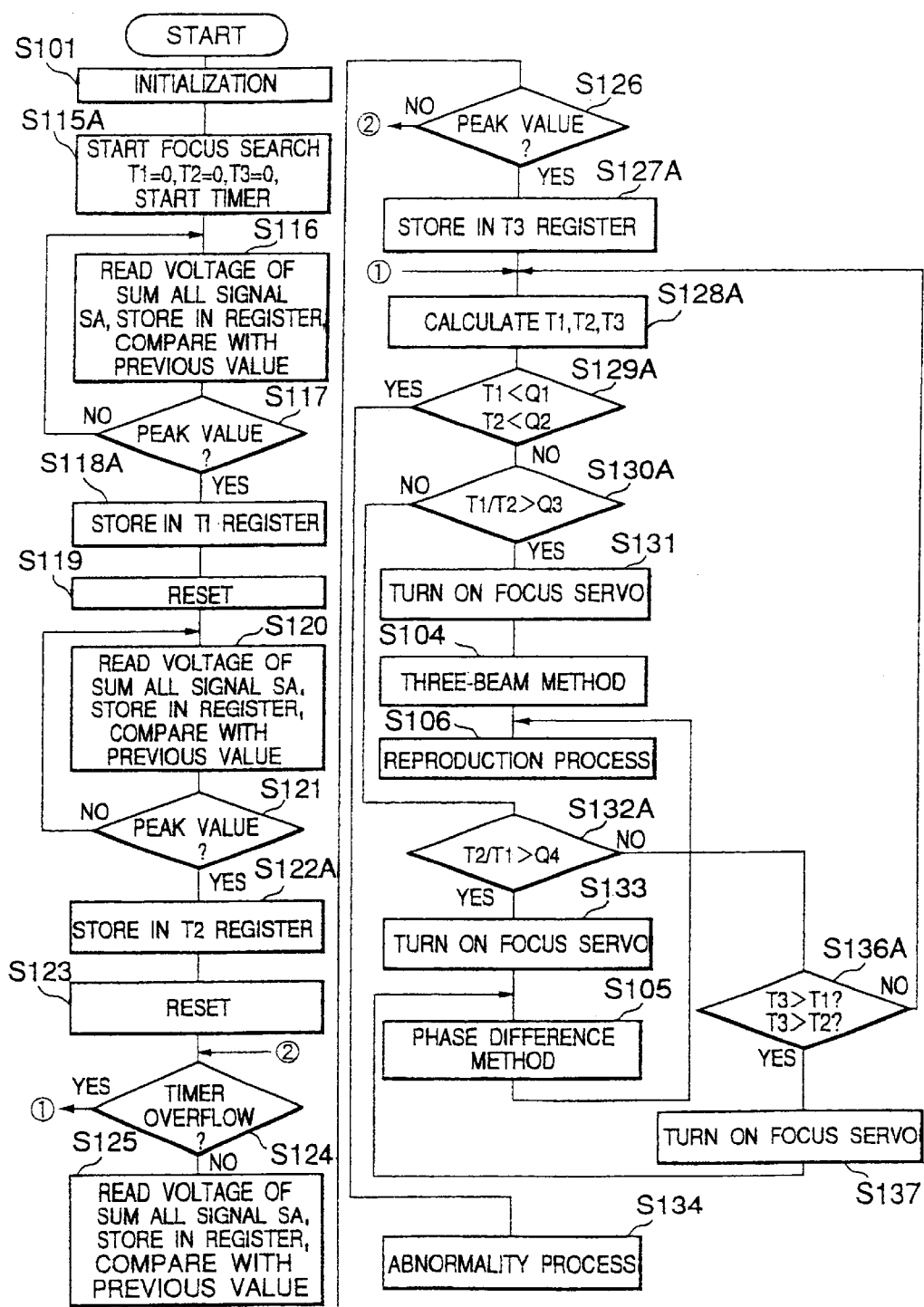
FIG. 27 is a flowchart showing another example of the operational procedure of the microcomputer to determine the disk type by means of the focus search and then control the switch 30 in FIG. 1 by using the determined result to thereby select one of the tracking error signals in the three-beam method and the phase difference method.

FIG. 27 is a flowchart showing an operational procedure of the microcomputer to select one of the tracking error signals of the three-beam method and the phase difference method similar to those in FIG. 26, in a case of using another method in which the determination of the disk type by means of the focus search is different from the example of FIG. 26. In an example of FIG. 27, time widths of portions corresponding to the peaks instead of the peak voltages V1, V2 and V3 in FIG. 26 are measured to thereby determine the disk type in accordance with the comparison between the measured time widths. Operations until a step S101 are similar to those in FIG. 23. The focus search is started at a step S115A. Contents of registers in which respectively peak time widths T1, T2 and T3 are respectively stored are set to 0. Then, a timer is started. Next, digital values obtained by A/D converting the voltages of the sum all signals SA are sequentially read in at a step S116, and are sequentially stored in predefined A/D conversion registers, and then are sequentially compared with a previous value. At a step S117, it is judged whether or not a peak value is detected as the sequential comparison results at the step S116. If YES, the time width is stored in a T1 register at a step 118A. If NO, the operational flow returns to the step S116.

After the operation at the step S117 is finished, the A/D conversion registers are reset at a step S119. Then, operations at steps S120, S121 similar to those at the steps S116, S117 are performed. A next time width is stored in a T2 register at a step 122A, and the A/D conversion registers are reset at a step S123. At a next step S124, it is judged whether or not a time measured by the timer exceeds a predefined time (overflow). If exceeded, the operational flow proceeds to a step S128. If not exceeded, the operational flow proceeds to a step S125. Operations at steps S125, S126 are respectively similar to those at the steps S116, S117. Then, the time width is stored in a T3 register at a step S127A. At a step 128A, comparison calculations are performed by using the respective time widths T1, T2 and T3 obtained until that time.

At a next step S129A, it is judged whether or not the T1 is smaller than a predefined value Q1 or the T2 is smaller than a predefined value Q2. If YES, the operational flow proceeds to an abnormality processing routine at a step S134. These predefined values Q1, Q2 are sufficiently smaller than the time width obtained by the focus search in the normal disk. If NO at the step S129A, it is judged at a step S130A whether or not T1/T2>Q3 (the Q3 is a ratio of T1 to T2 that is normally obtained in the disk having the thickness of 1.2 mm, for example, a predefined value of approximately 70%). If YES at the step S130A, a present disk is determined as a disk having a thickness of 1.2 mm. Then, a predefined focus servo control is turned on at a step S131. The tracking error signal by means of the three-beam method is selected at a next step S104. On the other hand, if NO at the step S130A, it is judged at a step S132A whether or not T2/T1>Q4 (the Q4 is a ratio of T2 to T1 that is normally obtained in the disk having the thickness of 0.6 mm, for example, a predefined value of approximately 70%).

If YES at the step S132A, a present disk is determined as a disk having a thickness of 0.6 mm. Then, a predefined focus servo control is turned on at a step S133. The tracking error signal by means of the phase difference method is selected at a next step S105. On the other hand, if NO at the step S132, it is judged at a step S136A whether or not T3>T1 (when the T3 is measured) and also T2>T1. If YES at the step S136A, the focus servo control is turned on at a peak center point C of the wave form shown at (3-*c*) of FIG. 5, at a step S137. Then, the operational flow proceeds to the step S105, and the phase difference method is selected. After the steps S104, S105, the reproduction process is performed at a step S106.

The time width T4 is not used in the flowchart in FIG. 27. The reason is described below. Namely, if the disk is determined as the two-layer disk by the detection of the T3 and by the comparison between the detected T3 and the T1 and the T2, a search time can be made short by turning on the servo control at a time point of the T3 before the T4 is detected. Although not shown especially in the flowchart of FIG. 27, parameters, such as the laser power of the optical head, the gain, the offset, the balance and the like in the circuit of generating the focus error signal and the tracking error signal, and the characteristic of the equalizer in FIG. 12 described hereinbelow are suitably switched and set in accordance with the determined disk type, similarly to the previous embodiment. The time widths of the signals (2-*c*), (2-*g*) and (2-*k*) in which the sum all signals SA are re-shaped are measured in this case. However, it is similarly allowable to measure all of the time widths T1, T2 and T3 of the signals (2-*d*), (2-*h*) and (2-*l*) in which the signals (2-*b*), (2-*f*) and (2-*j*) servicing as the focus error signal FE are re-shaped or a total of times of a section of the least value, a section of the intermediate value and a section of the maximum value in a three-value signal.

Next, an example of using a two-lens type of an optical pickup (optical head) is explained which uses two lenses switched by an actuator so that both DVD and CD can be reproduced by a single optical pickup. As such an optical pickup, for example, a twin-lens type of an optical pickup made by MITSUBISHI DENKI KABUSIKIKAISHA is considered which was exhibited at "International Optoelectronics Show 95" held on Nov. 11 to 14, 1995, in <MAKUHARI MESSE International Exhibition Hall>. This optical pickup has two objective lenses for the DVD and the CD. These lens are fitted to a rotatable lens holder. Since the lens holder is rotated by an electromagnetic actuator with a spindle as a center, a desired lens can be put on an optical path.

Figure 28:
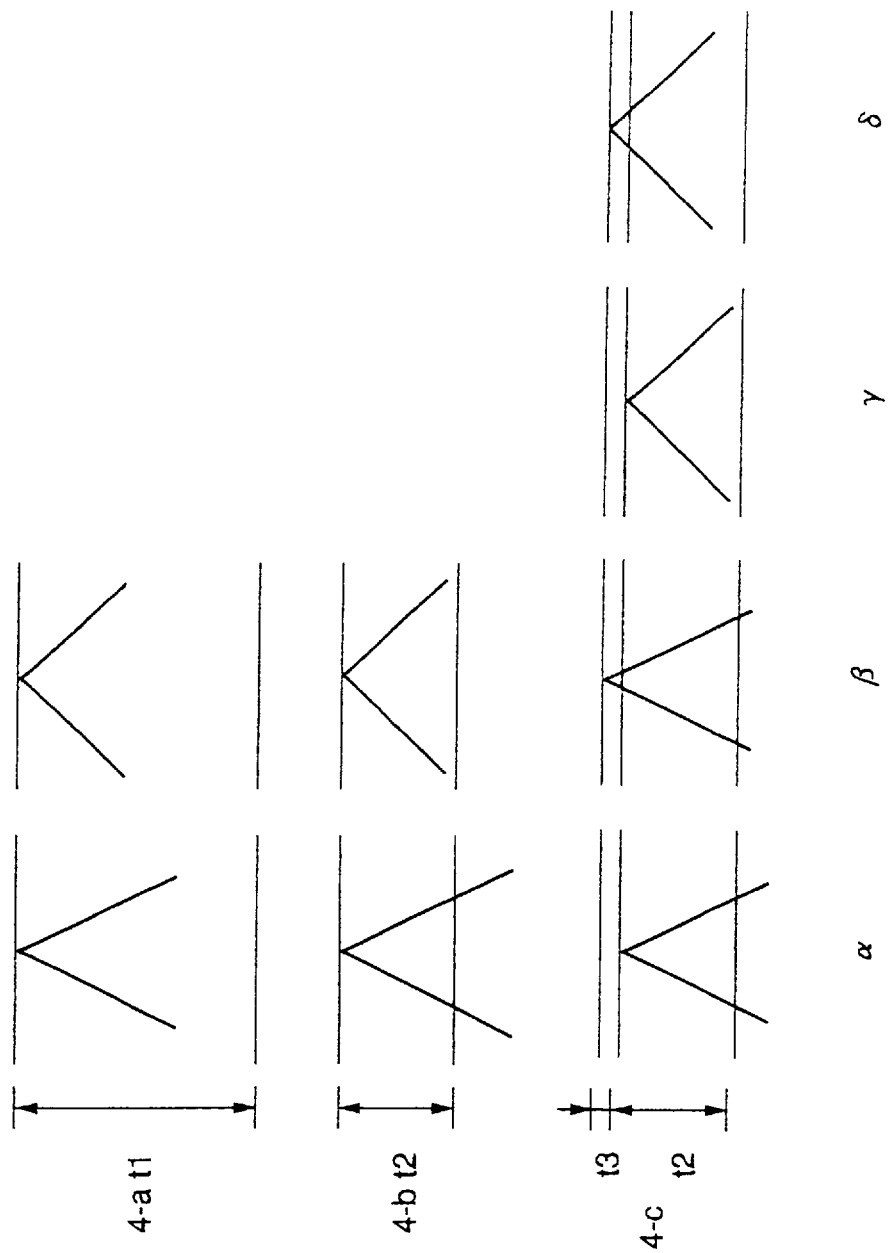
FIG. 28 is a view showing beam-collecting states of laser beams to respective disks when a two-lens type of an optical pickup is used.
Figure 29:
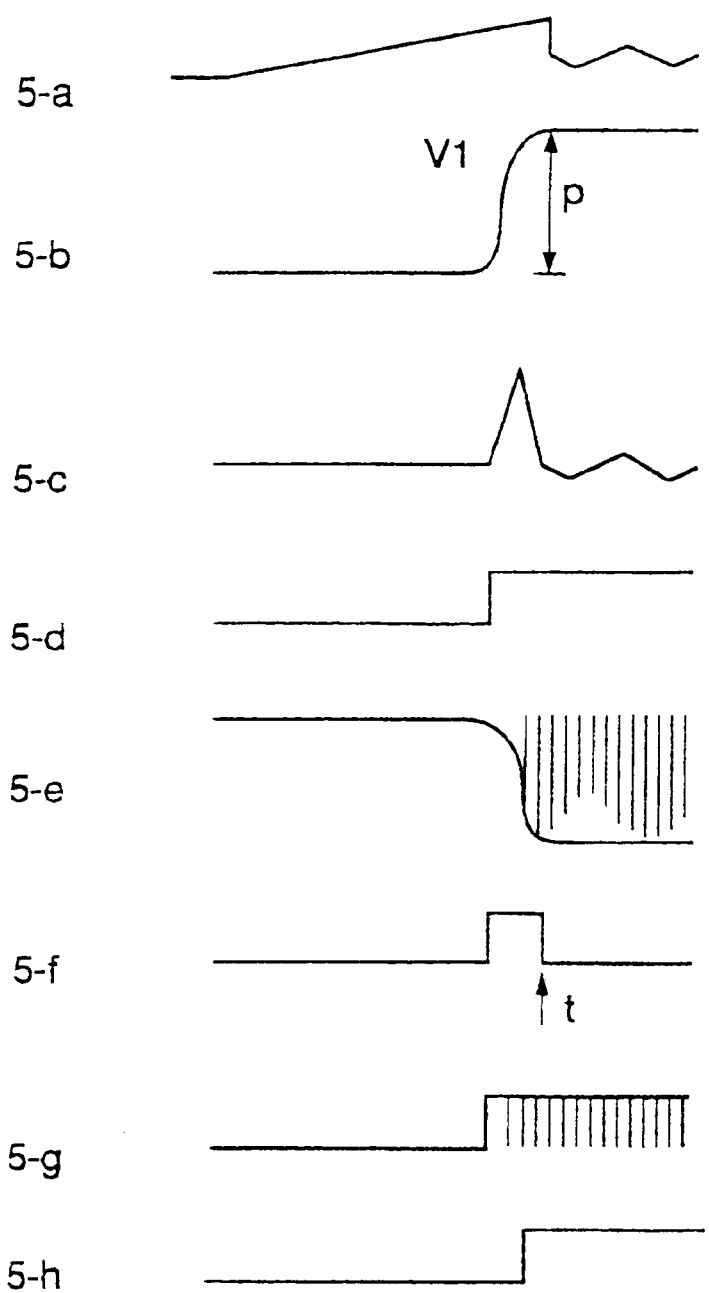
FIG. 29 is a wave form diagram showing various signal waves obtained from output signals when the focus search is performed by the two-lens type of the optical pickup.
Figure 30:
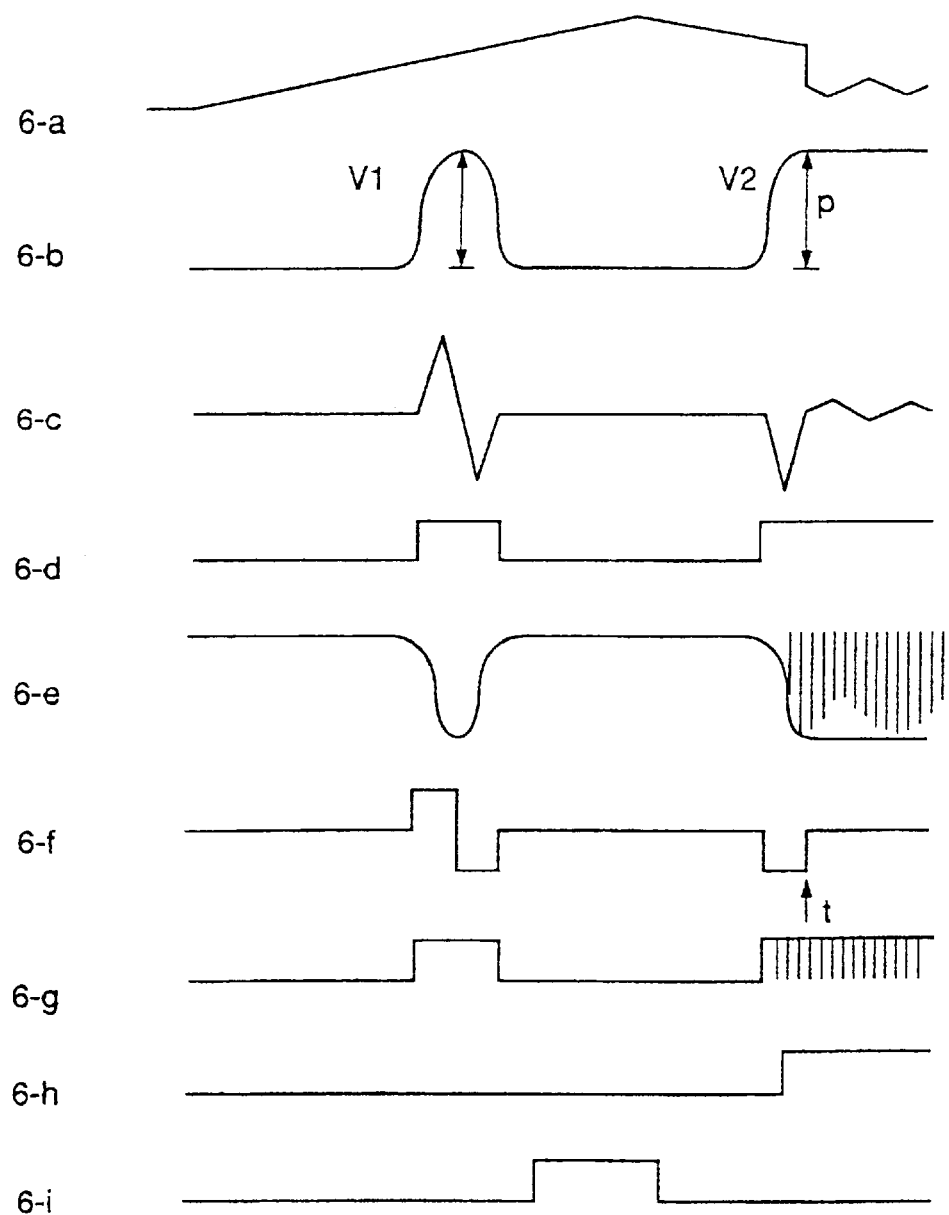
FIG. 30 is a wave form diagram showing various signal waves obtained from the output signals when the focus search is performed by the two-lens type of the optical pickup.

FIG. 28 is a view showing beam-collecting states of laser beams to respective disks when using this two-lens type of the optical pickup as the optical pickup 2 in FIG. 2. References (4-*a*), (4-*b*) and (4-*c*) show the beam-collecting states to a disk having a thickness t1=1.2 mm, a disk having a thickness t1=0.6 mm and a two-layer type disk whose one layer has a thickness of 0.6 mm (a distance between the layers t3=40 $\mu$m), respectively. Then, a beam with a narrow angle is used for 1.2 mm, and a beam with a wide angle is used for 0.6 mm. FIGS. 29 and 30 show various signal wave forms obtained from output signals when the focus search is performed by the two-lens type of the optical pickup 2. Namely, in FIGS. 29 to 31, each vertical axis shows a voltage, each horizontal axis shows a time and then each p shows a peak.

In the two-lens type of the optical pickup, if the lens corresponding to the thickness of the disk is not selected, the beams are not collected to one point because of spherical aberration, and thereby the record signal on the disk can not be read out. In FIG. 28, portions where the signals can be reproduced are only (4-*a*α), (4-*b*β), (4-*c*γ) and (4-*c*δ) in the vertical and horizontal reference symbols. In a case other than the above mentioned cases, although the signal can not be read out, the reflection light is slightly returned.

Figure 31:
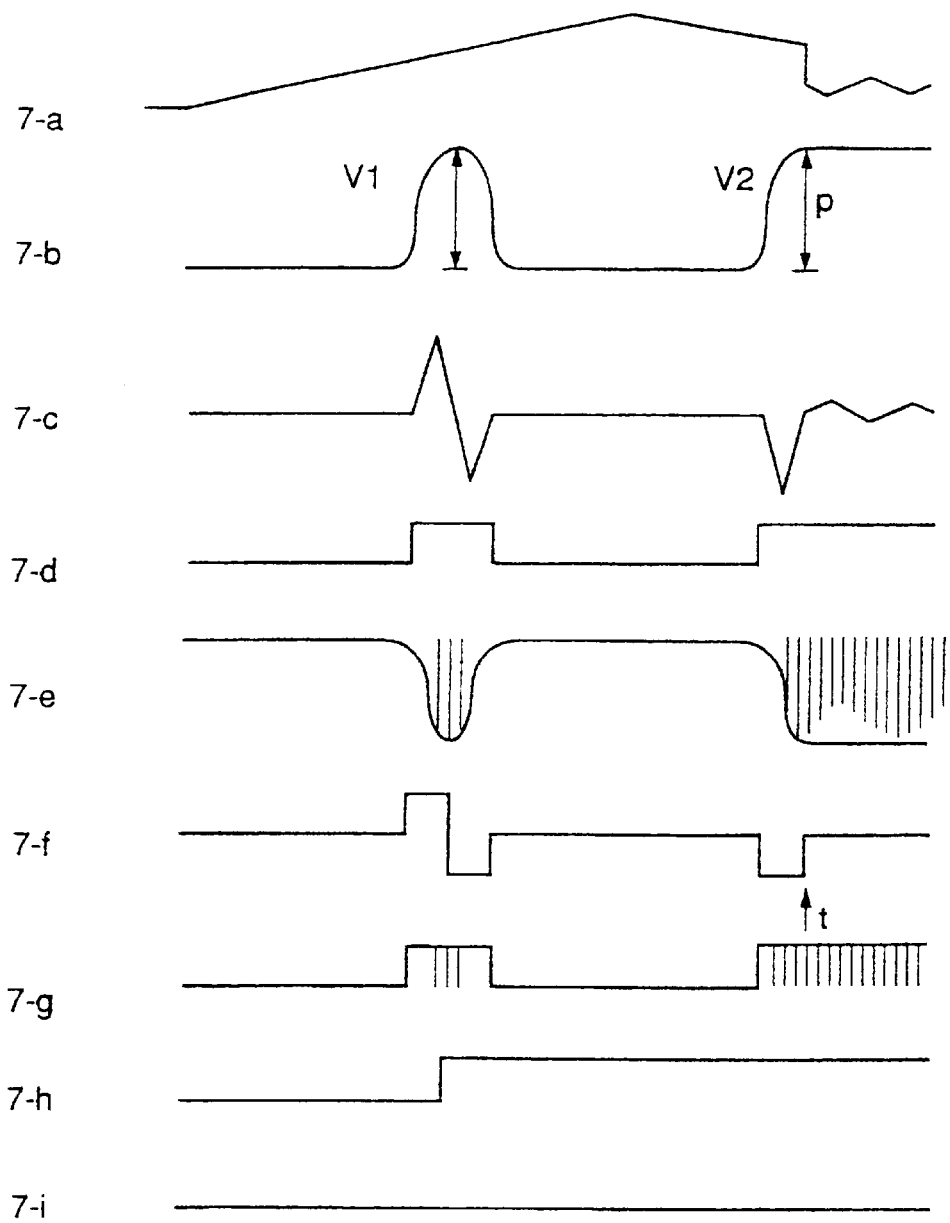
FIG. 31 is a wave form diagram showing various signal waves obtained from the output signals when the focus search is performed by the two-lens type of the optical pickup.

In FIG. 29, (5-*a*) shows a voltage applied to the focus coil, (5-*b*) shows a sum all signal SA, (5-*c*) shows a focus error signal, (5-*d*) shows a signal obtained by comparing the sum all signal SA with a threshold, (5-*e*) shows an EFM signal when the characteristic of the equalizer 46 is made flat, (5-*f*) shows a signal obtained by comparing the focus error signal (5-*d*) with a predefined threshold, (5-*g*) shows a signal obtained by comparing the EFM signal with the standard value Ref by the comparator 50 and (5-*h*) shows the HFDET (the output signal of the D-FF 56) in FIG. 17. Wave forms in FIG. 30 and FIG. 31 are substantially similar to those in FIG. 29. Incidentally, signals at (6-*i*) in FIG. 30 and at (7-*i*) in FIG. 31 are described later.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical disk reproducing apparatus which is able to reproduce the recorded signals recorded through an optical head and an optical system on two types of the optical disk having two kinds of thickness, the apparatus comprises:

numerical aperture setting means for substantially setting a numerical aperture (NA) of lens for laser beams emitted from the optical head to be set at a first value of the numerical aperture (NA) or a second value of the numerical aperture (NA);

focus search means for moving said optical head or said optical system in a focus direction to thereby perform a focus search in the status of setting the first value of the numerical aperture (NA) by said numerical aperture setting means;

first measuring means for measuring a first detection signal and a second detection signal, both of which are obtained from said optical head during the focus search by said focus search means;

first control means for controlling a focus of said optical head or said optical system, in the case of being fit for the relation between the first value of the numerical aperture (NA) and the thickness of the optical disk in accordance with the first detection signal and the second detection signal, both of which are measured by said first measuring means;

second measuring means for measuring a third detection signal and a fourth detection signal, both of which are obtained from said optical head during the focus search by said focus search means in the status of setting the second value of the numerical (NA) by said numerical aperture setting means, in the case of being unfit for the relation between the first value of the numerical aperture (NA) and the thickness of the optical disk in accordance with the first detection signal and the second detection signal, both of which are measured by said first measuring means;

second control means for controlling a focus of said optical head or said optical system in accordance with the third detection signal and the fourth detection signal, both of which are measured by said second measuring means.

2. The optical disk reproducing apparatus according to claim 1, wherein said numerical aperture setting means comprises means for selecting any one of two lenses.

* * * * *